United States Patent
Zhou et al.

(10) Patent No.: US 12,177,695 B2
(45) Date of Patent: Dec. 24, 2024

(54) SIDELINK BFR WITH RELAY UE RESELECTION IN MULTI-CONNECTIVITY SCENARIO

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 17/657,602

(22) Filed: Mar. 31, 2022

(65) Prior Publication Data

US 2023/0319603 A1 Oct. 5, 2023

(51) Int. Cl.
*H04W 88/04* (2009.01)
*H04W 24/04* (2009.01)
*H04W 24/08* (2009.01)

(52) U.S. Cl.
CPC ........... *H04W 24/04* (2013.01); *H04W 24/08* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 2020/0389223 A1* | 12/2020 | Guan | ............... | H04W 72/046 |
| 2022/0046485 A1* | 2/2022 | Hong | ............... | H04W 36/03 |
| 2022/0167240 A1* | 5/2022 | Liang | ............... | H04W 36/033 |
| 2023/0127924 A1* | 4/2023 | Srinivasan | ........ | H04W 28/0268 370/328 |
| 2023/0224987 A1* | 7/2023 | Kim | ............... | H04W 92/18 370/315 |
| 2024/0008109 A1* | 1/2024 | Kim | ............... | H04B 17/309 |
| 2024/0179726 A1* | 5/2024 | Wang | ............... | H04W 84/047 |
| 2024/0196301 A1* | 6/2024 | Back | ............... | H04W 40/12 |

* cited by examiner

*Primary Examiner* — Jenkey Van
(74) *Attorney, Agent, or Firm* — Procopio, Cory, Hargreaves & Savitch

(57) ABSTRACT

A UE may identify a first beam condition associated with one or more first beam pairs between the UE and a first relay UE. The UE may transmit to a network node, and the network node may receive, from the UE, a request to switch to a new relay UE based on the first beam condition. The network node may transmit, to the UE, and the UE may receive, from the network node, an indication to switch to a second relay UE based on the request. The UE may switch to the second relay UE based on the indication to switch to the second relay UE. The UE and the network node may communicate with each other via the second relay UE.

30 Claims, 14 Drawing Sheets

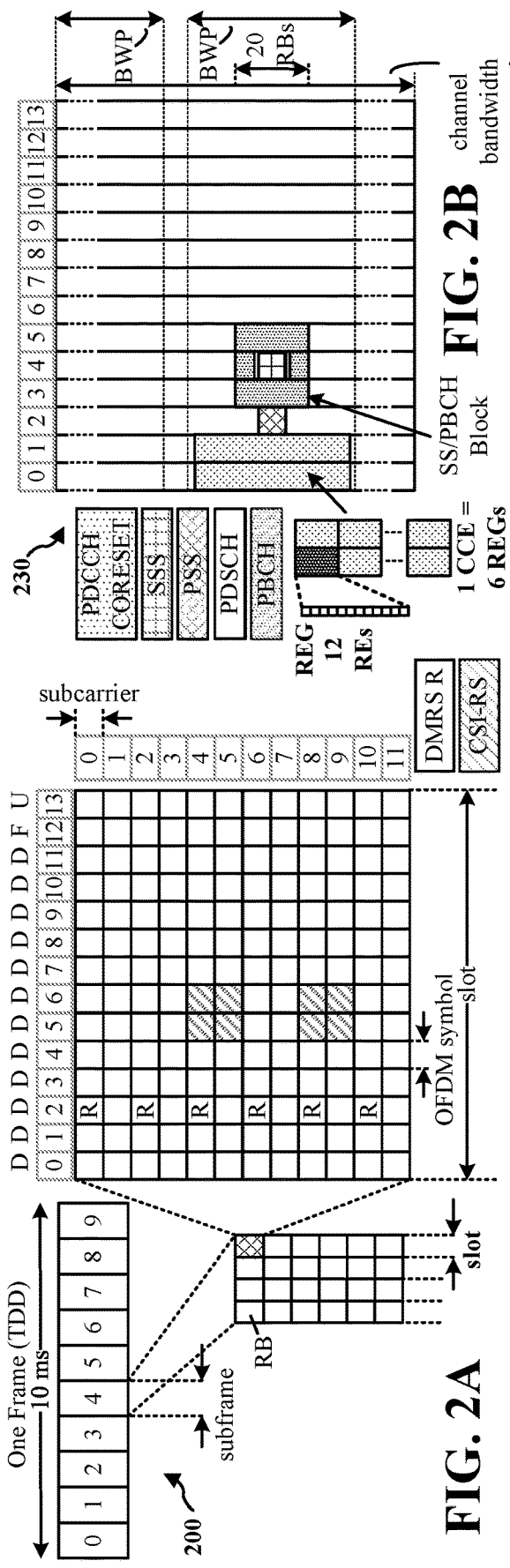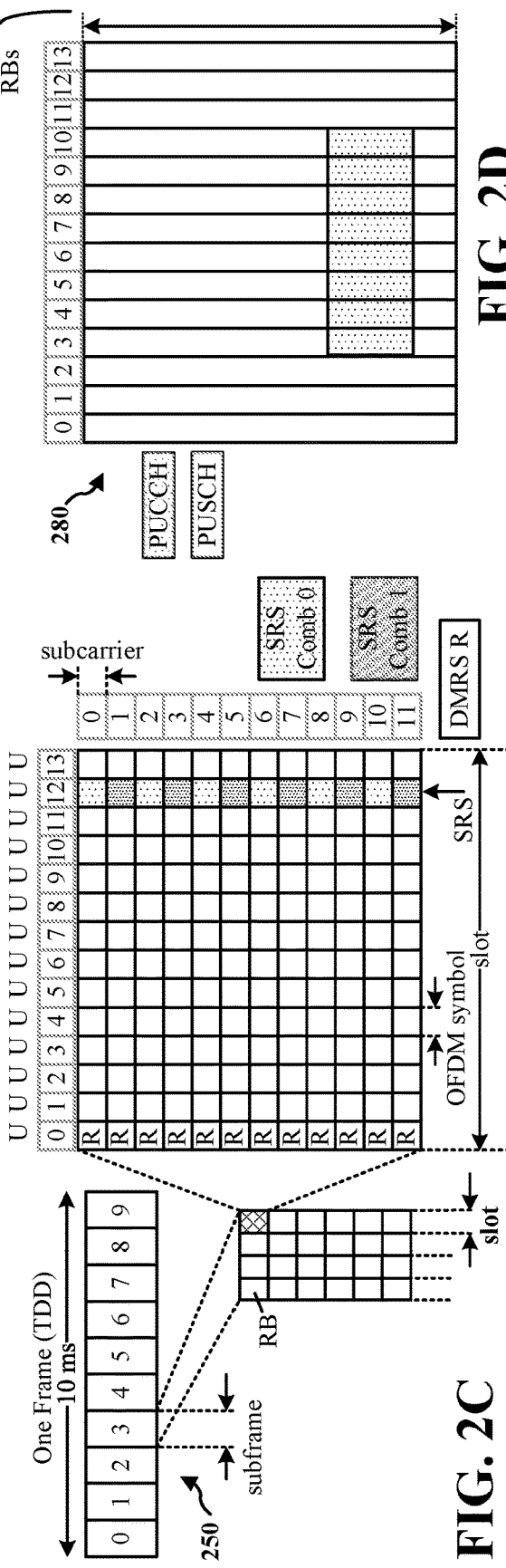
FIG. 2A
FIG. 2B
FIG. 2C
FIG. 2D

SIDELINK BFR WITH RELAY UE RESELECTION IN MULTI-CONNECTIVITY SCENARIO

TECHNICAL FIELD

The present disclosure relates generally to communication systems, and more particularly, to beam failure management and recovery for a sidelink associated with a relay user equipment (UE) in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus may identify a first beam condition associated with one or more first beam pairs between the UE and a first relay UE. The apparatus may transmit, to a network node, a request to switch to a new relay UE based on the first beam condition. The apparatus may receive, from the network node, an indication to switch to a second relay UE based on the request. The apparatus may switch to the second relay UE based on the indication to switch to the second relay UE.

In an aspect of the disclosure, a method, a computer-readable medium, and an apparatus are provided. The apparatus may be a network node. The apparatus may receive, from a UE, a request to switch to a new relay UE based on a first beam condition associated with one or more first beam pairs between the UE and a first relay UE. The apparatus may transmit, to the UE, an indication to switch to a second relay UE based on the request. The apparatus may communicate with the UE via the second relay UE.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
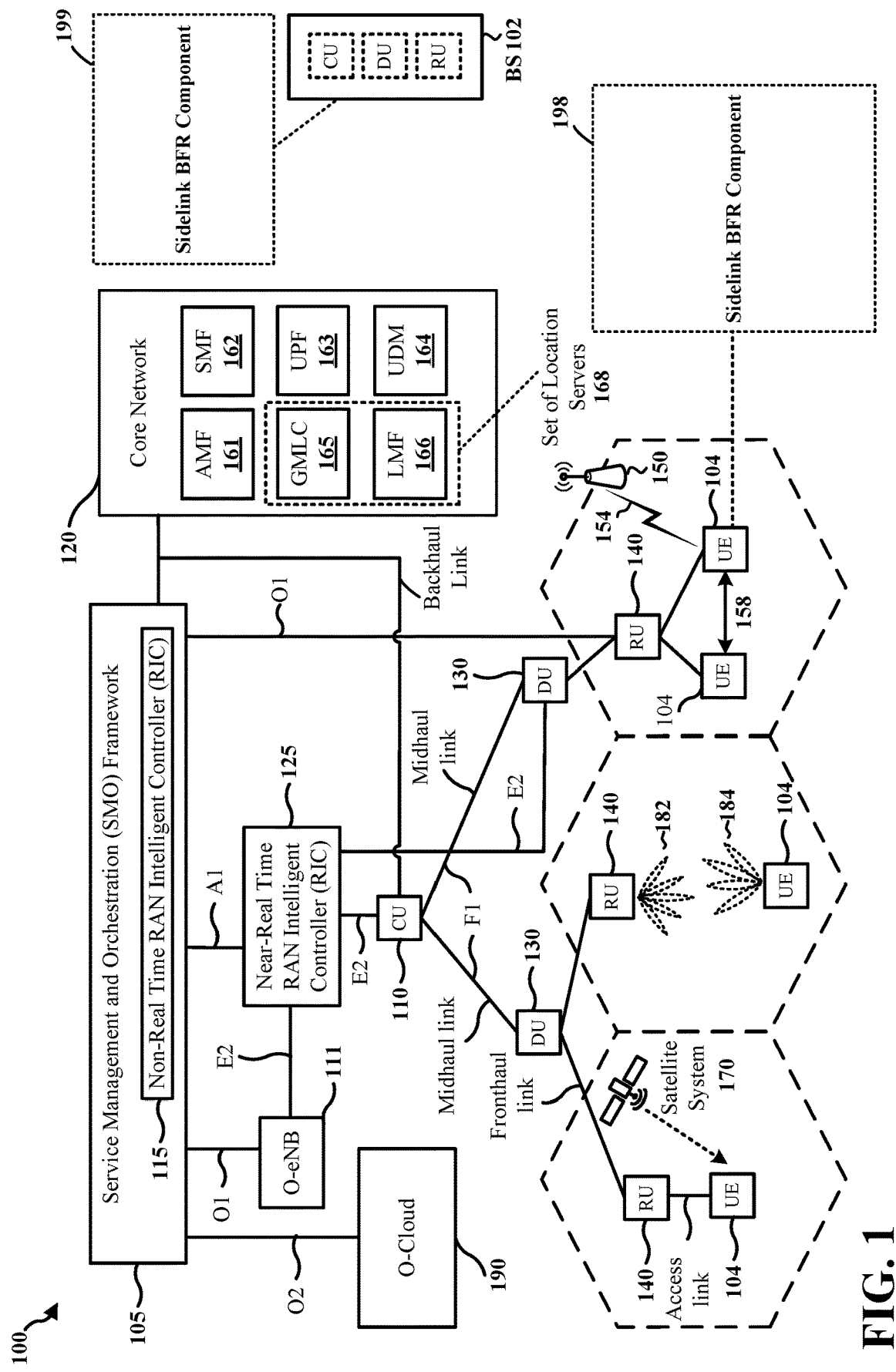
FIG. 1 is a diagram illustrating an example of a wireless communications system and an access network.

In some configurations, a source UE may be in a multi-connectivity state where the UE may be connected to a base station via two separate links including a direct Uu link with the base station and a relayed link via a relay UE, where the UE may be connected to the relay UE via a sidelink. Further, due to the uncertain nature of the wireless environment and unexpected blocking, beams may be vulnerable to beam failure. In particular, beams may be especially vulnerable to beam failure at higher frequencies where the beams may be narrower. In some configurations, a beam failure recovery (BFR) procedure may be performed for a failed beam for the Uu link. It may be desirable to perform a BFR procedure for a failed beam for the sidelink as well. The BFR procedure for the sidelink may be especially useful for a UE in the multi-connectivity mode where the UE may communicate with a base station via both a direct Uu link and a relayed link including a sidelink with a relay UE.

In one or more configurations, a UE may identify a first beam condition associated with one or more first beam pairs between the UE and a first relay UE. The UE may transmit to a network node, and the network node may receive, from the UE, a request to switch to a new relay UE based on the first beam condition. The network node may transmit, to the UE, and the UE may receive, from the network node, an indication to switch to a second relay UE based on the request. The UE may switch to the second relay UE based on the indication to switch to the second relay UE. The UE and the network node may communicate with each other via the second relay UE. Accordingly, a BFR operation may be performed for a sidelink associated with a relay UE where a beam failure (BF) is detected for the sidelink associated with the relay UE. The BFR operation may include a reselection to a new relay UE. Based on the relayed link via the new relay UE, the source UE may continue to benefit from the advantages associated with the multi-connectivity mode.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit— User Plane (CU-UP)), control plane functionality (i.e., Central Unit— Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190)

to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies.

Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite system 170 (e.g., one or more of a Global Navigation Satellite System (GNSS), satellite positioning system (SPS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a sidelink BFR component 198 that may be configured to identify a first beam condition associated with one or more first beam pairs between the UE and a first relay UE. The sidelink BFR component 198 may be configured to transmit, to a network node, a request to switch to a new relay UE based on the first beam condition. The sidelink BFR component 198 may be configured to receive, from the network node, an indication to switch to a second relay UE based on the request. The sidelink BFR component 198 may be configured to switch to the second relay UE based on the indication to switch to the second relay UE. In certain aspects, the base station 102 may include a sidelink BFR component 199 that may be configured to receive, from a UE, a request to switch to a new relay UE based on a first beam condition associated with one or more first beam pairs between the UE and a first relay UE. The sidelink BFR component 199 may be configured to transmit, to the UE, an indication to switch to a second relay UE based on the request. The sidelink BFR component 199 may be configured to communicate with the UE via the second relay UE. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu} * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
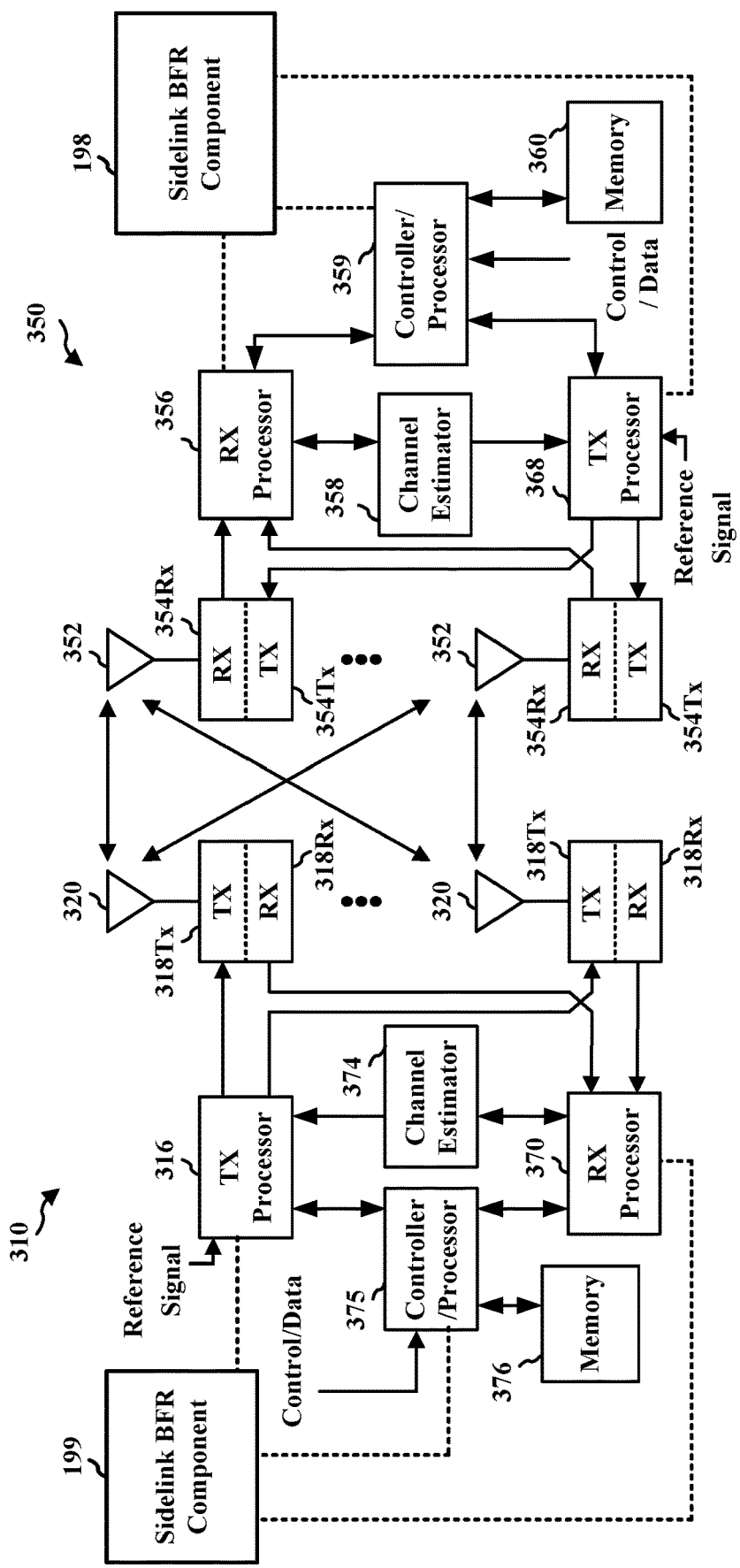
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink BFR component 198 of FIG. 1.

At least one of the TX processor 316, the RX processor 370, and the controller/processor 375 may be configured to perform aspects in connection with the sidelink BFR component 199 of FIG. 1.

Figure 4:
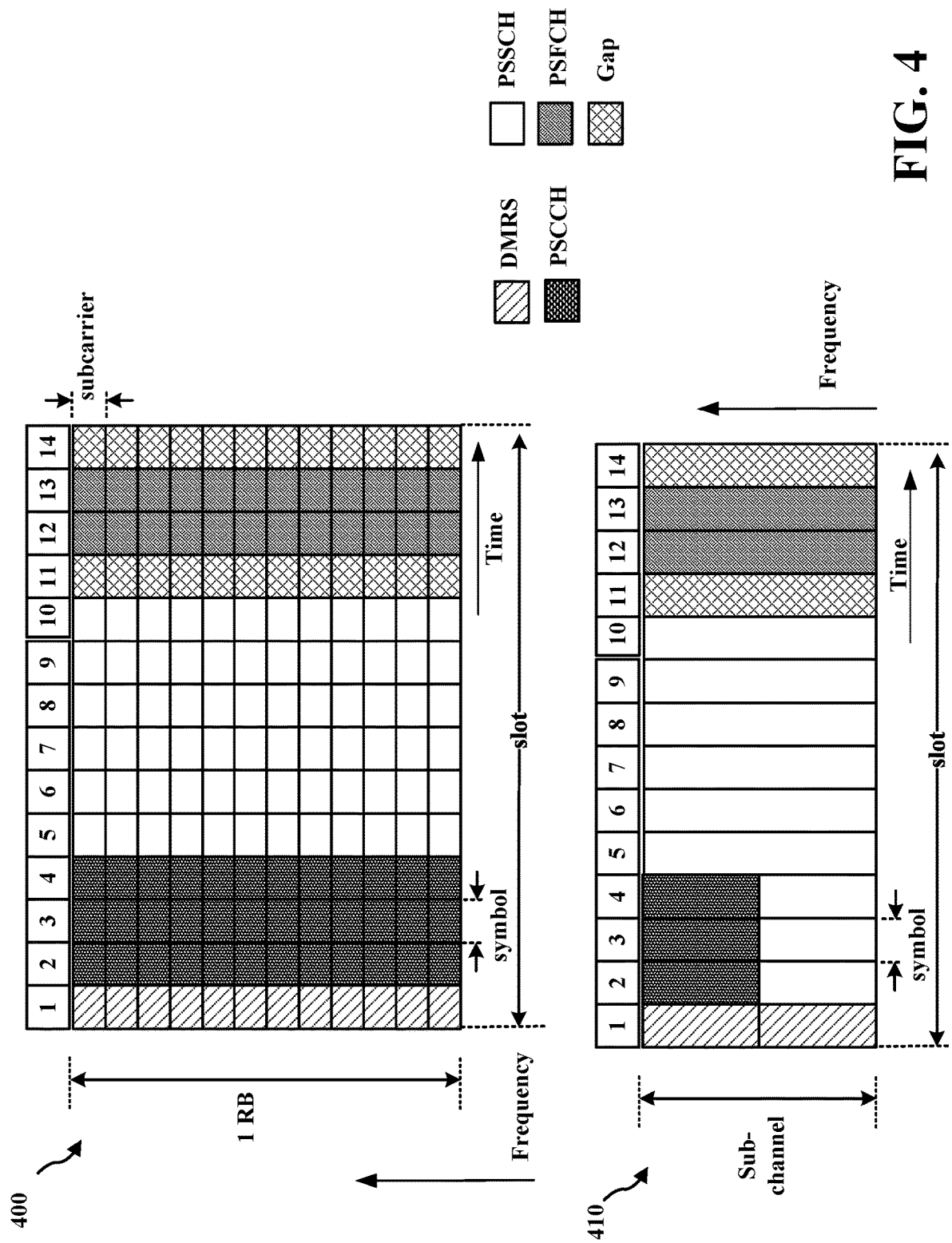
FIG. 4 includes diagrams illustrating example aspects of slot structures that may be used for sidelink communication.

FIG. 4 includes diagrams 400 and 410 illustrating example aspects of slot structures that may be used for sidelink communication (e.g., between UEs 104, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A PSCCH may be configured to occupy multiple PRBs, e.g., 10, 12, 15, 20, or 25 PRBs. The PSCCH may be limited to a single subchannel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The PSSCH occupies at least one subchannel. The PSCCH may include a first portion of sidelink control information (SCI), and the PSSCH may include a second portion of SCI in some examples.

As illustrated in FIG. 4, some of the REs may include control information in PSCCH and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or listen before transmit (LBT) symbols may be different than the example illustrated in FIG. 4. Multiple slots may be aggregated together in some aspects.

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices, in order to select transmission resources that avoid collisions with other devices. The sidelink transmission and/or the resource reservation may be periodic or aperiodic, where a UE may reserve resources for transmission in a current slot and up to two future retransmissions using the SCI.

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding SCI transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., subchannels per subframe) reserved by the UE may depend on the size of data to be transmitted by the UE. Although the example is described for a UE receiving reservations from another UE, the reservations may also be received from a roadside unit (RSU) or other device communicating based on sidelink.

An SCI message may be provided in a first stage and a second stage. The first stage may be referred to as SCI-1 and the second stage may be referred to as SCI-2. SCI-1 may be transmitted via a PSCCH, and may include resource allocation information and information for decoding the SCI-2 (e.g., a format of SCI-2 and/or other information). The resource allocation information may indicate resources for the SCI-2 and/or a PSSCH. In one configuration, the SCI-2 may be transmitted via a PSSCH. The SCI-2 may include information for decoding the data portion of the PSSCH. In some aspects, SCI-2 may be mapped to contiguous RBs in the PSSCH, starting from a first symbol with a PSSCH DMRS. In some aspects, the SCI-2 may be scrambled separately from the data portion of the PSSCH.

In some configurations, a source UE (or simply a "UE" hereinafter) may be in a multi-connectivity state where the UE may be connected to a base station via two separate links including a direct Uu link with the base station and a relayed link via a relay UE, where the UE may be connected to the relay UE via a sidelink. Accordingly, the UE may then be able to communicate with the base station both directly or through the relay UE. Utilizing the two separate links, the UE may offload some traffic from the Uu link to the relayed link via the relay UE to better utilize available resources. The wireless communication of the UE may be enhanced as a result.

Furthermore, beamforming may be a technique often used to compensate for the high data loss in high frequency (e.g., higher band) communication. For a UE in the multi-connectivity mode, beamforming may be utilized on both the direct Uu link and the sidelink between the UE and the relay UE.

Due to the uncertain nature of the wireless environment and unexpected blocking, beams may be vulnerable to beam failure. In particular, beams may be especially vulnerable to beam failure at higher frequencies where the beams may be narrower.

In some configurations, a BFR procedure may be performed for a failed beam for the Uu link. It may be desirable to perform a BFR procedure for a failed beam for the sidelink as well. The BFR procedure for the sidelink may be especially useful for a UE in the multi-connectivity mode where the UE may communicate with a base station via both a direct Uu link and a relayed link including a sidelink with a relay UE.

Accordingly, one or more aspects of the disclosure may relate to the BFR procedure for the sidelink. In particular, in some configurations, in the event of a sidelink beam failure, a UE may reselect a different neighboring UE as the relay UE.

Figure 5:
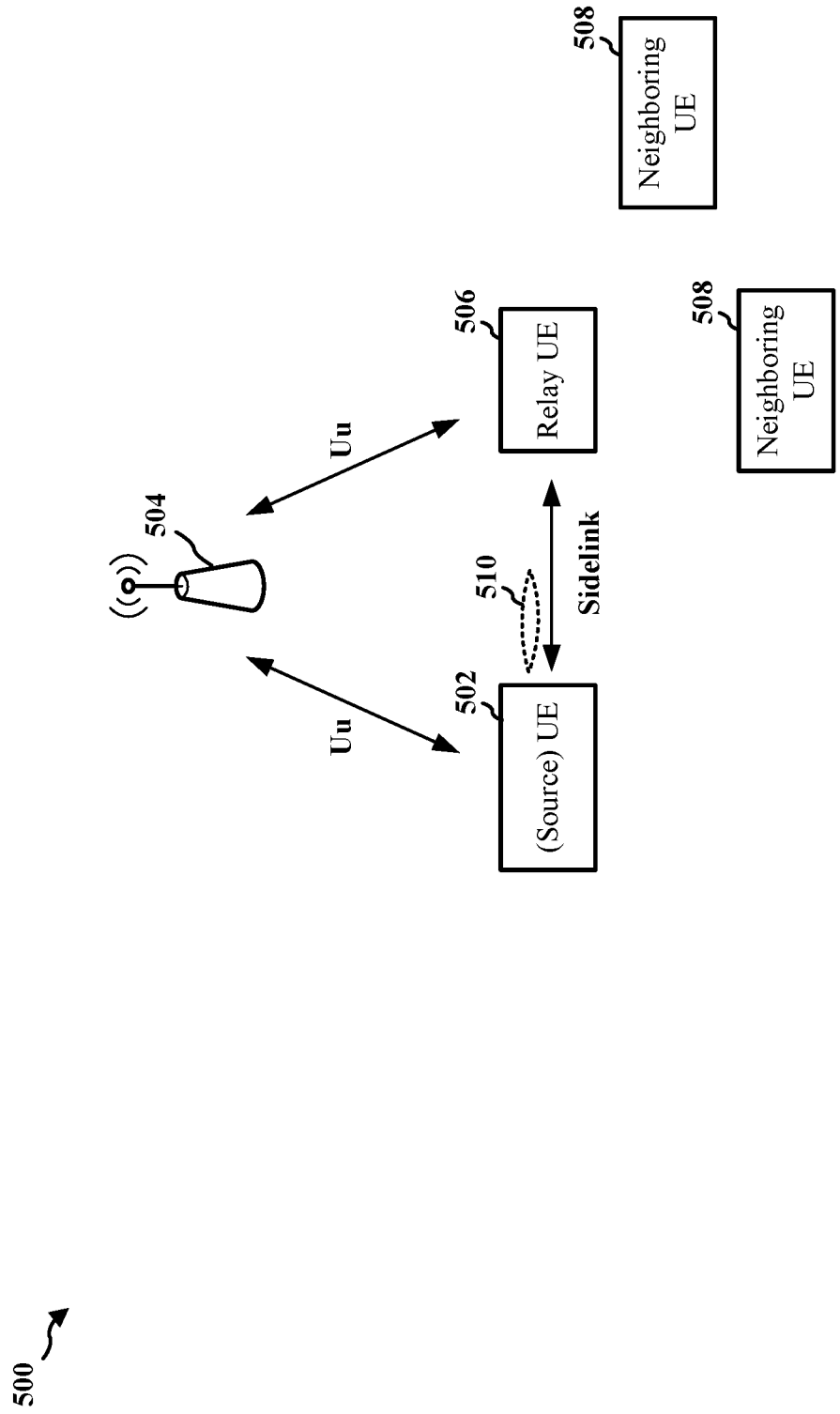
FIG. 5 is a block diagram illustrating an example environment in which aspects of the disclosure may be practiced.

FIG. 5 is a block diagram illustrating an example environment 500 in which aspects of the disclosure may be practiced. A source UE 502 may be connected to a base station 504 in a multi-connectivity mode. In particular, the source UE 502 may be connected to the base station 504 via a direct Uu link. Further, the source UE 502 may be connected to a relay UE 506 via a sidelink (e.g., a PC5 link) based on a beam (pair) 510. The relay UE 506 may be connected to the base station 504 via a direct Uu link. Accordingly, in addition to using the direct Uu link between the source UE 502 and the base station 504, the source UE 502 may also communicate with the base station 504 using the relayed link via the relay UE 506, where the relayed link may include the sidelink between the source UE 502 and the relay UE 506 and the Uu link between the relay UE 506 and the base station 504.

In one or more configurations, the source UE 502 may observe one or more neighboring UEs 508 in addition to the relay UE 506. Further, the source UE 502 may perform measurements for at least some neighboring UEs 508 in the observed neighboring UEs 508. For example, for each neighboring UE 508 to be measured, the source UE 502 may measure the channel condition between the source UE 502 and the neighboring UE 508 and/or a respective beam (pair) quality for one or more candidate beam pairs between the source UE 502 and the neighboring UE 508.

Figure 6:
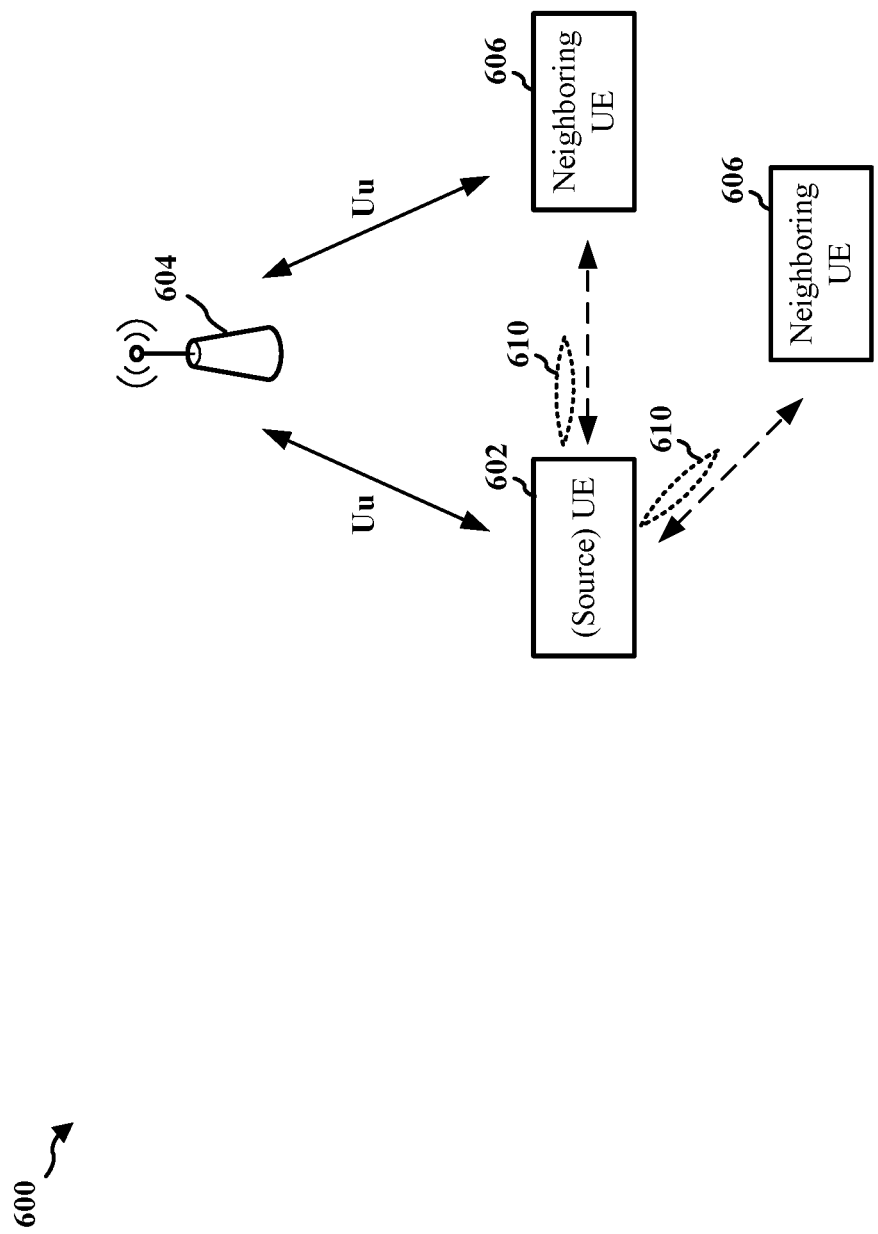
FIG. 6 is a block diagram illustrating operations associated with a candidate relay UE pool according to one or more aspects.

FIG. 6 is a block diagram 600 illustrating operations associated with a candidate relay UE pool according to one or more aspects. In one or more configurations, the sidelinks in FIG. 6 may operate based on the Mode 1 resource allocation (scheduling) mode. In some examples, the source UE 602 may observe one or more neighboring UEs 606, and may perform measurements for at least one neighboring UEs 606 in the observed neighboring UEs 606. For example, for each neighboring UE 606 to be measured, the source UE 602 may measure a beam quality of a beam (pair) 610 between the source UE 602 and the neighboring UE 606. Further, the source UE 602 may report the measurement results to the base station 604. In one or more configurations, the source UE 602 may report the measurement results to the base station 604 periodically or from time to time.

Based on the measurement report received from the source UE 602, the base station 604 may compile a candidate pool including neighboring UEs 606 that may be used as relay UEs between the source UE 602 and the base station 604. Further, the base station 604 may transmit a configuration of the candidate pool to the source UE 602. In one configuration, one neighboring UE 606 among the neighboring UEs 606 in the candidate pool may be a primary candidate relay UE. For example, a neighboring UE 606 currently serving as the relay UE for the source UE 602 may be the primary candidate relay UE. Further, other (non-primary) neighboring UEs 606 in the candidate pool may be ranked based on the respective beam (pair) quality of the beam (pair) between the source UE 602 and the respective neighboring UE 606. In particular, a neighboring UE 606 in the candidate pool that is associated with a higher beam (pair) quality may be ranked higher in the candidate pool.

As the source UE 602 may periodically or from time to time transmit updated measurement reports of the neighboring UEs 606 to the base station 604, the base station 604 may update the candidate pool for the source UE 602 based on the updated measurement reports. In one or more configurations, the source UE 602 may request an update to the candidate pool for the source UE 602. In some examples, the source UE 602 may request the update to the candidate pool upon discovery of a new neighboring UE 606 that may be used as the relay UE or upon detection of a channel/beam (pair) quality/strength change (e.g., a sudden change) associated with the sidelinks between the source UE 602 and at least some neighboring UEs 606 in the candidate pool. Accordingly, based on the request to update the candidate pool received from the source UE 602, the base station 604 may transmit, to the source UE 602, an updated configuration of the candidate pool for the source UE 602.

Figure 7:
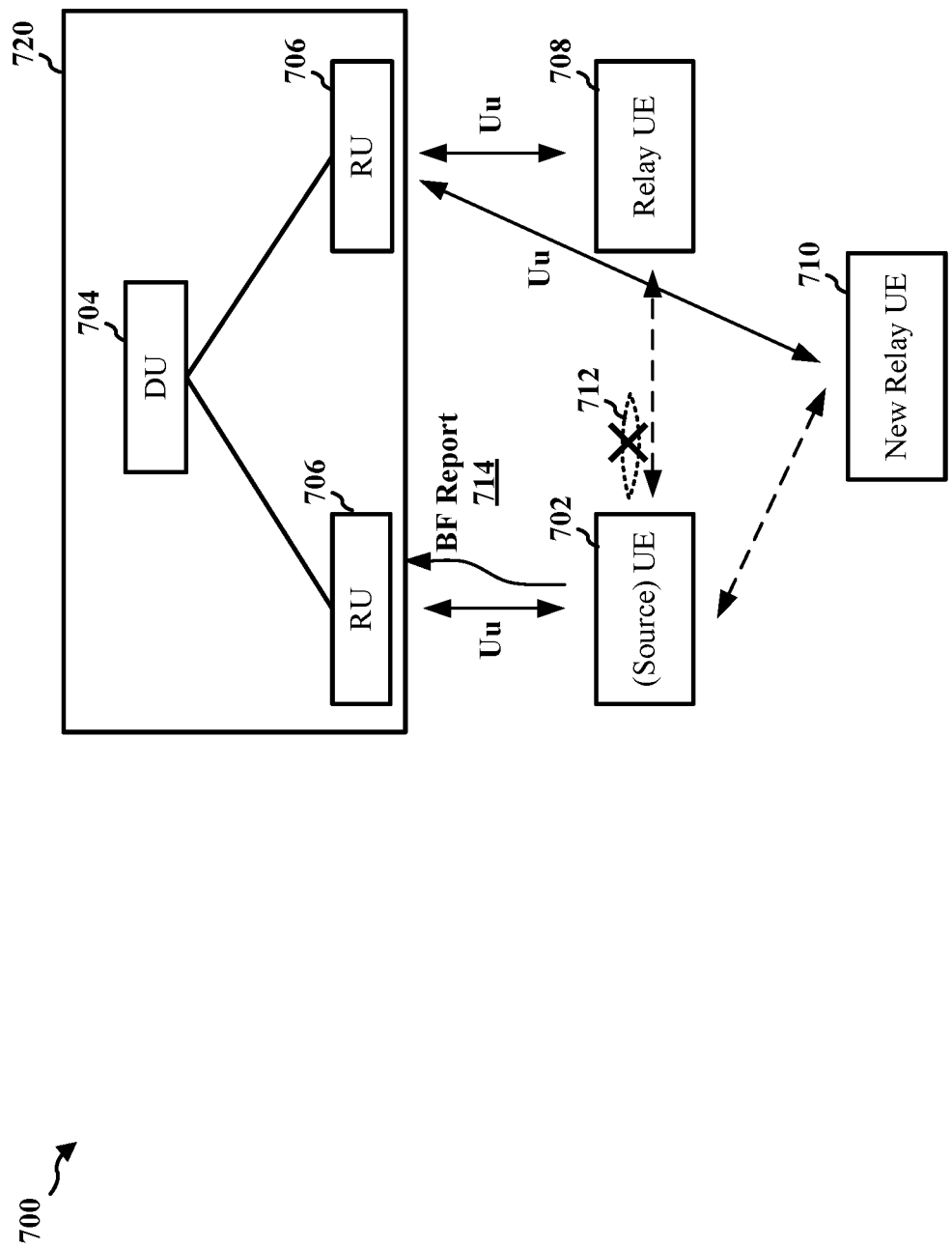
FIG. 7 is a block diagram illustrating an example BFR operation for a sidelink in a multi-connectivity setting according to one or more aspects.

FIG. 7 is a block diagram illustrating an example BFR operation 700 for a sidelink in a multi-connectivity setting according to one or more aspects. A base station/network node 720 may include a DU 704 and one or more RUs 706. In one or more configurations, upon detecting that certain conditions including a triggering condition associated with a beam (pair) 712 between the source UE 702 and the relay UE 708 are met, a source UE 702 may transmit a BF report 714 to the base station 720. In one or more configurations, the source UE 702 may transmit the BF report 714 to the base station 720 via a MAC—control element (CE) (MAC-CE) or a UCI message. In one configuration, the BF report 714 may include a request to switch to a new relay UE (e.g., the new relay UE 710). For example, one of the triggering conditions may be that no working beam may be found available between the source UE 702 and the current relay UE 708. In one configuration, the source UE 702 may include, in the request to switch to a new relay UE, an indication of a source UE-desired (preferred) or source UE-selected new relay UE. The source UE-desired (preferred) or source UE-selected new relay UE may be from the candidate pool configured with the source UE 602. Further, in one configuration, the source UE 602 may include, in the request to switch to a new relay UE, one or more of a channel measurement result or a measured beam (pair) condition/quality associated with the source UE-desired (preferred) or source UE-selected new relay UE.

Examples of the triggering condition associated with the BF report 714 may include one or more of a current sidelink beam 712 failure, a predicted potential sidelink beam failure (e.g., in the near future) associated with the sidelink beam 712 in use, a sidelink beam failure detection (BFD) procedure status (e.g., the sidelink BFD procedure status may indicate a poor sidelink beam 712 quality/condition or a sidelink beam 712 failure), or availability of a more suitable neighboring UE (which may be an preexisting neighboring UE or a new neighboring UE) (e.g., a neighboring UE associated with a better sidelink beam (pair) quality/condition) that may be used as the new relay UE.

In one or more configurations, upon receiving the BF report 714 from the source UE 702, the base station 720 may transmit, to the source UE 702, an indication of a new relay UE 710 for the source UE 702. In one or more configurations, the base station 702 may transmit, to the source UE 702, the indication of the new relay UE 710 via a MAC-CE or a DCI message. The new relay UE 710 may be connected to the base station 720 via a direct Uu link (through a same RU 706 as the previous relay UE 708 or through a different RU 706 from the previous relay UE 708). The new relay UE 710 may be a same UE as the source UE-desired (preferred) or source UE-selected new relay UE as indicated in the request to switch to a new relay UE from the source UE 702, or may be a different UE from the source UE-desired (preferred) or source UE-selected new relay UE. In one or more configurations, the base station 720 may include, in the indication of the new relay UE 710, an indication of a sidelink beam (pair) to use by the source UE 702 with the new relay UE 710. In one configuration, in addition to transmitting the indication of the new relay UE 710, the base station 720 may also update the candidate pool for the source UE 702, and may transmit an updated configuration of the candidate pool for the source UE 702 to the source UE 702.

Figure 8:
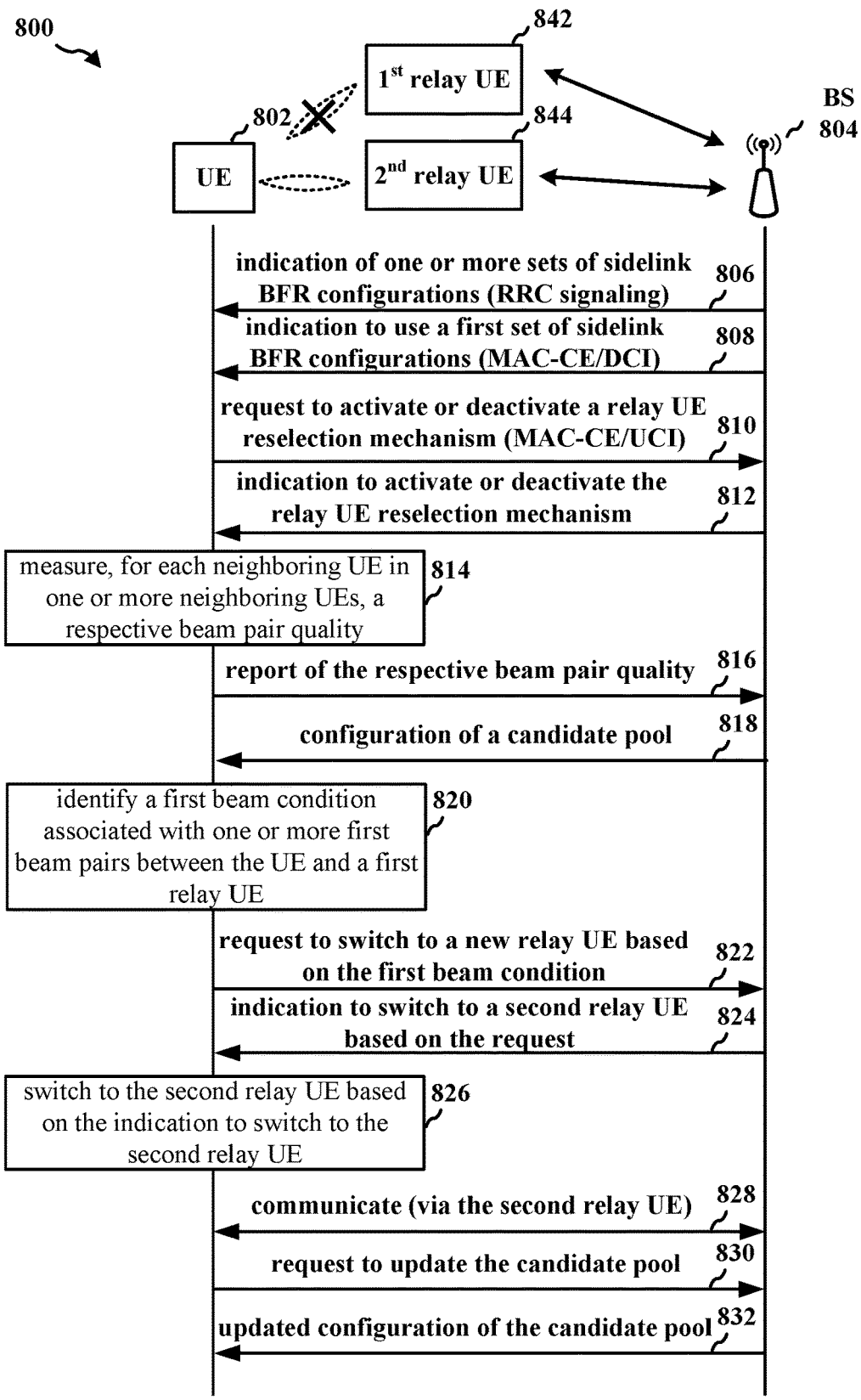
FIG. 8 is a diagram of a communication flow of a method of wireless communication according to one or more aspects.

FIG. 8 is a diagram of a communication flow 800 of a method of wireless communication according to one or more aspects. The UE 802 may correspond to the source UE 702 in FIG. 7. The base station/network node 804 may correspond to the base station/network node 720 in FIG. 7. The first relay UE 842 may correspond to the relay UE 708 in FIG. 7. Further, the second relay UE 844 may correspond to the new relay UE 710 in FIG. 7. At 806, the network node 804 may transmit, to the UE 802, and the UE 802 may receive, from the network node 804, via RRC signaling, an indication of one or more sets of sidelink BFR configurations.

In one or more configurations, each set of sidelink BFR configurations in the one or more sets of sidelink BFR configurations 806 may include a configuration for a sidelink candidate pool measurement report or a configuration for a beam failure report for a relay UE reselection. For example, each set of sidelink BFR configurations may include or correspond to one or more of a candidate pool/neighboring UE measurement metric(s), a candidate pool/neighboring UE report frequency, a content specification of the BF report, or one or more BF report triggering conditions (e.g., first beam conditions).

At 808, the network node 804 may transmit, to the UE 802, and the UE 802 may receive, from the network node 804, via a MAC-CE or a DCI message, an indication to use a first set of sidelink BFR configurations in the one or more sets of sidelink BFR configurations. Accordingly, where multiple possible values of at least one parameter are configured at 806, the network node 804 may switch between the values or configurations (e.g., activate one of the values or configurations) for the at least one parameter using the MAC-CE or the DCI message at 808.

At 810, the UE 802 may transmit, to the network node 804, and the network node 804 may receive, from the UE 802, via a first MAC-CE or a UCI message, a request to activate or deactivate a relay UE reselection mechanism.

At 812, the network node 804 may transmit, to the UE 802, and the UE 802 may receive, from the network node 804, via a second MAC-CE or a DCI message, an indication to activate or deactivate the relay UE reselection mechanism based on the request 810 to activate or deactivate the relay UE reselection mechanism.

In one or more configurations, the request 810 to activate or deactivate the relay UE reselection mechanism or the indication 812 to activate or deactivate the relay UE reselection mechanism may be based on at least one of a beam pair quality of one or more neighboring UEs, a capability of the one or more neighboring UEs, a quality of service (QoS) specification, a UE 802 discontinuous reception (DRX) configuration, a power constraint of the UE 802, a capacity constraint of the UE 802, or a capability constraint of the UE 802, etc.

At 814, the UE 802 may measure, for each neighboring UE in one or more neighboring UEs, a respective beam pair quality associated with one or more respective beam pairs between the UE 802 and the neighboring UE.

At 816, the UE 802 may transmit, to the network node 804, and the network node 804 may receive, from the UE 802, for each neighboring UE in the one or more neighboring UEs, a report of the respective beam pair quality.

At 818, the network node 804 may transmit, to the UE 802, and the UE 802 may receive, from the network node 804, a configuration of a candidate pool including one or more candidate relay UEs. In one configuration, the candidate pool may be created or updated based on the report 816. In one configuration, each candidate relay UE in the one or more candidate relay UEs in the candidate pool may be associated with a respective beam pair quality associated with one or more respective beam pairs between the UE 802 and the candidate relay UE. In one configuration, the one or more candidate relay UEs may be ranked based on respective beam pair qualities.

At 820, the UE 802 may identify a first beam condition associated with one or more first beam pairs between the UE 802 and a first relay UE 842. In one or more configurations, the first beam condition may correspond to at least one of a current sidelink beam failure, a predicted sidelink beam failure, or availability of a more suitable relay UE.

At 822, the UE 802 may transmit, to a network node 804, and the network node 804 may receive, from the UE 802, a request to switch to a new relay UE based on the first beam condition. In one configuration, the request 822 to switch to the new relay UE may include a request to switch to a third relay UE. The third relay UE may be selected by the UE 802. In one configuration, the request 822 to switch to the new relay UE may further include a channel measurement associated with the third relay UE or a beam pair quality associated with the third relay UE.

At 824, the network node 804 may transmit, to the UE 802, and the UE 802 may receive, from the network node 804, an indication to switch to a second relay UE 844 based on the request 822. In one or more configurations, the second relay UE 844 and the third relay UE may be a same relay UE or may be different relay UEs. In one configuration, the indication 824 to switch to the second relay UE 844 may further include an indication of a beam pair to use between the UE 802 and the second relay UE 844. In one or more configurations, the indication 824 to switch to the second relay UE 844 may be transmitted and received via a MAC-CE or a DCI message.

At 826, the UE 802 may switch to the second relay UE 844 based on the indication 906 to switch to the second relay UE 844.

At 828, the UE 802 and the network node 804 may at least in part communicate with each other via the second relay UE 844.

At 830, the UE 802 may transmit, to the network node 804, and the network node 804 may receive, from the UE 802, a request to update the candidate pool based on discovery of a new neighboring UE or a change associated with an existing candidate relay UE.

At 832, the network node 804 may transmit, to the UE 802, and the UE 802 may receive, from the network node 804, an updated configuration of the candidate pool.

Figure 9:
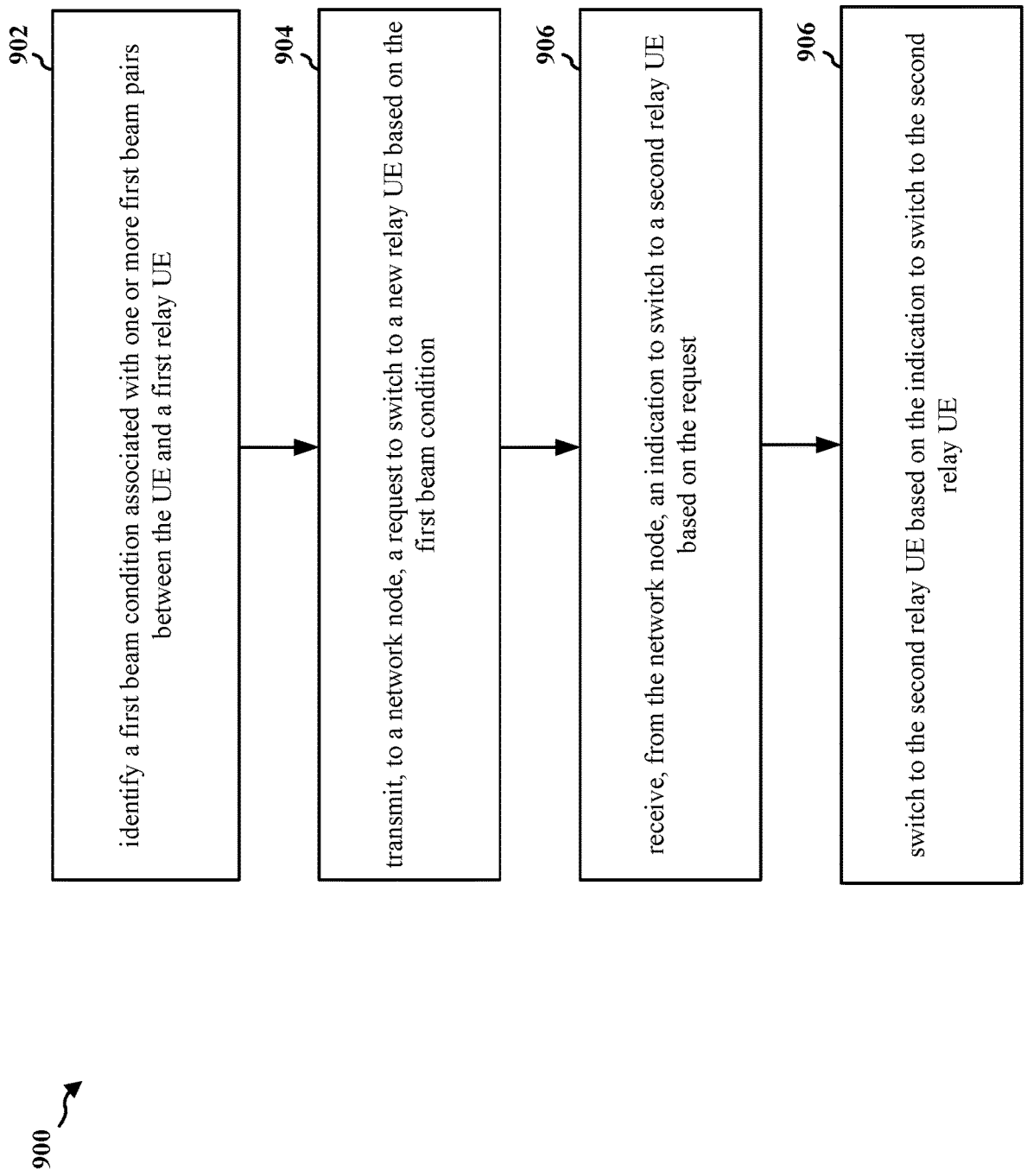
FIG. 9 is a flowchart of a method of wireless communication.

FIG. 9 is a flowchart 900 of a method of wireless communication. The method may be performed by a UE (e.g., the UE 104/350/802; the apparatus 1304). At 902, the UE may identify a first beam condition associated with one or more first beam pairs between the UE and a first relay UE. For example, 902 may be performed by the component 198 in FIG. 13. Referring to FIG. 8, at 820, the UE 802 may identify a first beam condition associated with one or more first beam pairs between the UE 802 and a first relay UE 842.

At 904, the UE may transmit, to a network node, a request to switch to a new relay UE based on the first beam condition. For example, 904 may be performed by the component 198 in FIG. 13. Referring to FIG. 8, at 822, the UE 802 may transmit, to a network node 804, a request to switch to a new relay UE based on the first beam condition.

At 906, the UE may receive, from the network node, an indication to switch to a second relay UE based on the request. For example, 906 may be performed by the component 198 in FIG. 13. Referring to FIG. 8, at 824, the UE 802 may receive, from the network node 804, an indication to switch to a second relay UE 844 based on the request 822.

At 908, the UE may switch to the second relay UE based on the indication to switch to the second relay UE. For example, 908 may be performed by the component 198 in FIG. 13. Referring to FIG. 8, at 826, the UE 802 may switch to the second relay UE 844 based on the indication 906 to switch to the second relay UE 844.

Figure 10:
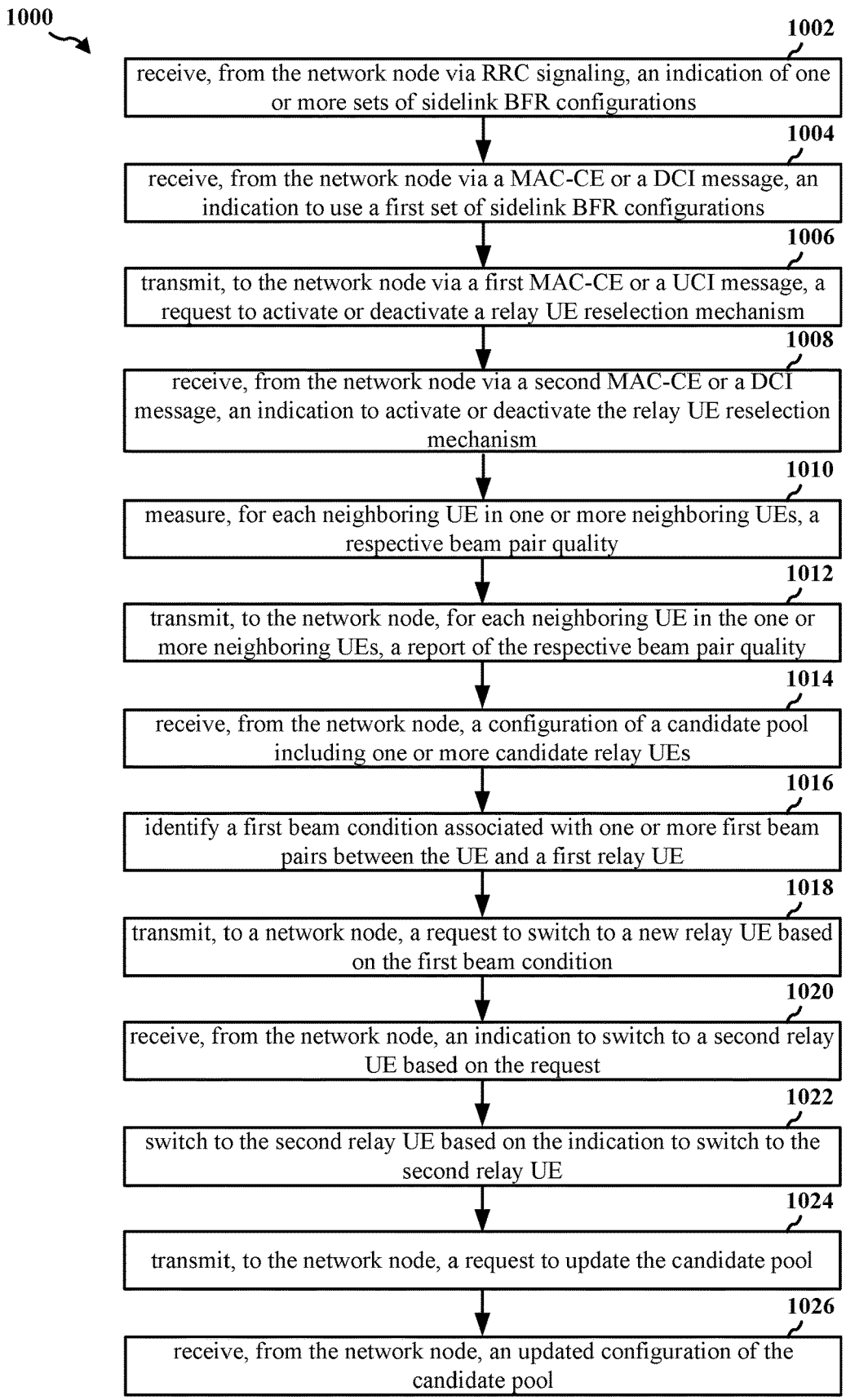
FIG. 10 is a flowchart of a method of wireless communication.

FIG. 10 is a flowchart 1000 of a method of wireless communication. The method may be performed by a UE (e.g., the UE 104/350/802; the apparatus 1304). At 1016, the UE may identify a first beam condition associated with one or more first beam pairs between the UE and a first relay UE. For example, 1016 may be performed by the component 198 in FIG. 13. Referring to FIG. 8, at 820, the UE 802 may identify a first beam condition associated with one or more first beam pairs between the UE 802 and a first relay UE 842.

At 1018, the UE may transmit, to a network node, a request to switch to a new relay UE based on the first beam condition. For example, 1018 may be performed by the component 198 in FIG. 13. Referring to FIG. 8, at 822, the UE 802 may transmit, to a network node 804, a request to switch to a new relay UE based on the first beam condition.

At 1020, the UE may receive, from the network node, an indication to switch to a second relay UE based on the request. For example, 1020 may be performed by the component 198 in FIG. 13. Referring to FIG. 8, at 824, the UE 802 may receive, from the network node 804, an indication to switch to a second relay UE 844 based on the request 822.

At 1022, the UE may switch to the second relay UE based on the indication to switch to the second relay UE. For example, 1022 may be performed by the component 198 in FIG. 13. Referring to FIG. 8, at 826, the UE 802 may switch to the second relay UE 844 based on the indication 906 to switch to the second relay UE 844.

In one configuration, referring to FIG. 8, the request 822 to switch to the new relay UE may include a request to switch to a third relay UE.

In one configuration, the second relay UE and the third relay UE may be a same relay UE or may be different relay UEs.

In one configuration, at 1014, the UE may receive, from the network node, a configuration of a candidate pool including one or more candidate relay UEs. The third relay UE may be selected from the candidate pool. For example, 1014 may be performed by the component 198 in FIG. 13. Referring to FIG. 8, at 818, the UE 802 may receive, from the network node 804, a configuration of a candidate pool including one or more candidate relay UEs.

In one configuration, referring to FIG. 8, each candidate relay UE in the one or more candidate relay UEs in the candidate pool may be associated with a respective beam pair quality associated with one or more respective beam pairs between the UE 802 and the candidate relay UE. The one or more candidate relay UEs may be ranked based on respective beam pair qualities.

In one configuration, at 1010, the UE may measure, for each neighboring UE in one or more neighboring UEs, a respective beam pair quality associated with one or more respective beam pairs between the UE and the neighboring UE. For example, 1010 may be performed by the component 198 in FIG. 13. Referring to FIG. 8, at 814, the UE 802 may measure, for each neighboring UE in one or more neighboring UEs, a respective beam pair quality associated with one or more respective beam pairs between the UE 802 and the neighboring UE.

At 1012, the UE may transmit, to the network node, for each neighboring UE in the one or more neighboring UEs, a report of the respective beam pair quality. The candidate pool may be created or updated based on the report. For example, 1012 may be performed by the component 198 in FIG. 13. Referring to FIG. 8, at 816, the UE 802 may transmit, to the network node 804, for each neighboring UE in the one or more neighboring UEs, a report of the respective beam pair quality.

In one configuration, at 1024, the UE may transmit, to the network node, a request to update the candidate pool based on discovery of a new neighboring UE or a change associated with an existing candidate relay UE. For example, 1024 may be performed by the component 198 in FIG. 13. Referring to FIG. 8, at 830, the UE 802 may transmit, to the network node 804, a request to update the candidate pool based on discovery of a new neighboring UE or a change associated with an existing candidate relay UE.

At 1026, the UE may receive, from the network node, an updated configuration of the candidate pool. For example, 1026 may be performed by the component 198 in FIG. 13. Referring to FIG. 8, at 832, the UE 802 may receive, from the network node 804, an updated configuration of the candidate pool.

In one configuration, referring to FIG. 8, the request 822 to switch to the new relay UE may further include a channel measurement associated with the third relay UE or a beam pair quality associated with the third relay UE.

In one configuration, referring to FIG. 8, the indication 824 to switch to the second relay UE 844 may further include an indication of a beam pair to use between the UE 802 and the second relay UE 844.

In one configuration, referring to FIG. 8, the indication 824 to switch to the second relay UE 844 may be received from the network node 804 via a MAC-CE or a DCI message.

In one configuration, the first beam condition may correspond to at least one of a current sidelink beam failure, a predicted sidelink beam failure, or availability of a more suitable relay UE.

In one configuration, at 1002, the UE may receive, from the network node via RRC signaling, an indication of one or more sets of sidelink BFR configurations. Each set of sidelink BFR configurations in the one or more sets of sidelink BFR configurations may include a configuration for a sidelink candidate pool measurement report or a configuration for a beam failure report for a relay UE reselection. For example, 1002 may be performed by the component 198 in FIG. 13. Referring to FIG. 8, at 806, the UE 802 may receive, from the network node 804 via RRC signaling, an indication of one or more sets of sidelink BFR configurations.

At 1004, the UE may receive, from the network node via a MAC-CE or a DCI message, an indication to use a first set of sidelink BFR configurations in the one or more sets of sidelink BFR configurations. For example, 1004 may be performed by the component 198 in FIG. 13. Referring to FIG. 8, at 808, the UE 802 may receive, from the network node 804 via a MAC-CE or a DCI message, an indication to use a first set of sidelink BFR configurations in the one or more sets of sidelink BFR configurations.

In one configuration, at 1006, the UE may transmit, to the network node via a first MAC-CE or a UCI message, a request to activate or deactivate a relay UE reselection mechanism. For example, 1006 may be performed by the component 198 in FIG. 13. Referring to FIG. 8, at 810, the UE 802 may transmit, to the network node 804 via a first MAC-CE or a UCI message, a request to activate or deactivate a relay UE reselection mechanism.

At 1008, the UE may receive, from the network node via a second MAC-CE or a DCI message, an indication to activate or deactivate the relay UE reselection mechanism based on the request to activate or deactivate the relay UE reselection mechanism. The request to activate or deactivate the relay UE reselection mechanism or the indication to activate or deactivate the relay UE reselection mechanism may be based on at least one of a beam pair quality of one or more neighboring UEs, a capability of the one or more neighboring UEs, a QoS specification, a UE DRX configuration, a power constraint of the UE, a capacity constraint of the UE, or a capability constraint of the UE. For example, 1008 may be performed by the component 198 in FIG. 13. Referring to FIG. 8, at 812, the UE 802 may receive, from the network node 804 via a second MAC-CE or a DCI message, an indication to activate or deactivate the relay UE reselection mechanism based on the request 810 to activate or deactivate the relay UE reselection mechanism.

Figure 11:
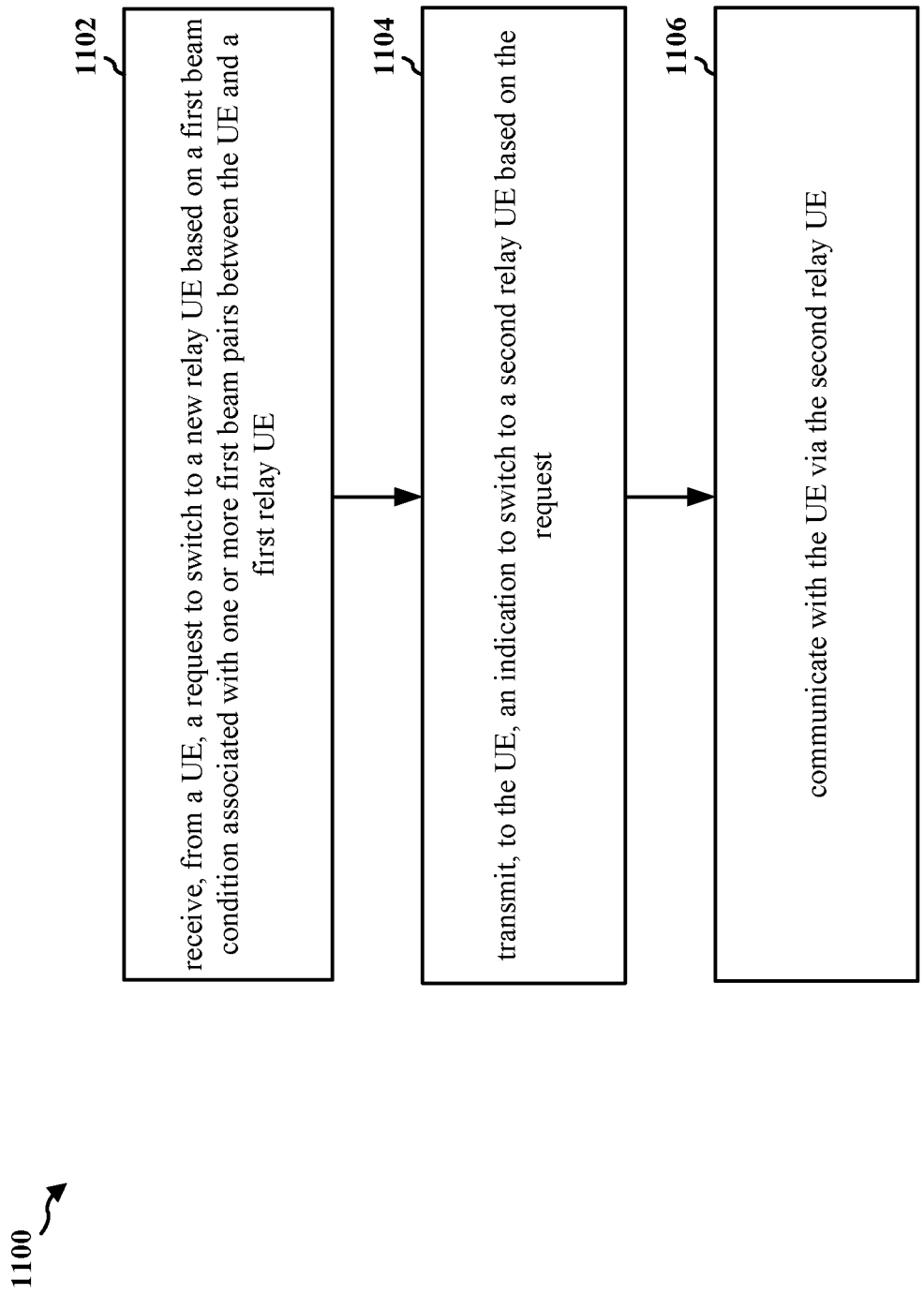
FIG. 11 is a flowchart of a method of wireless communication.

FIG. 11 is a flowchart 1100 of a method of wireless communication. The method may be performed by a network node (e.g., the base station 102/310/804; the network entity 1402). At 1102, the network node may receive, from a UE, a request to switch to a new relay UE based on a first beam condition associated with one or more first beam pairs between the UE and a first relay UE. For example, 1102 may be performed by the component 199 in FIG. 14. Referring to FIG. 8, at 822, the network node 804 may receive, from a UE 802, a request to switch to a new relay UE based on a first beam condition associated with one or more first beam pairs between the UE 802 and a first relay UE 842.

At 1104, the network node may transmit, to the UE, an indication to switch to a second relay UE based on the request. For example, 1104 may be performed by the component 199 in FIG. 14. Referring to FIG. 8, at 824, the network node 804 may transmit, to the UE 802, an indication to switch to a second relay UE 844 based on the request 822.

At 1106, the network node may communicate with the UE via the second relay UE. For example, 1106 may be performed by the component 199 in FIG. 14. Referring to FIG. 8, at 828, the network node 804 may communicate with the UE 802 via the second relay UE 844.

Figure 12:
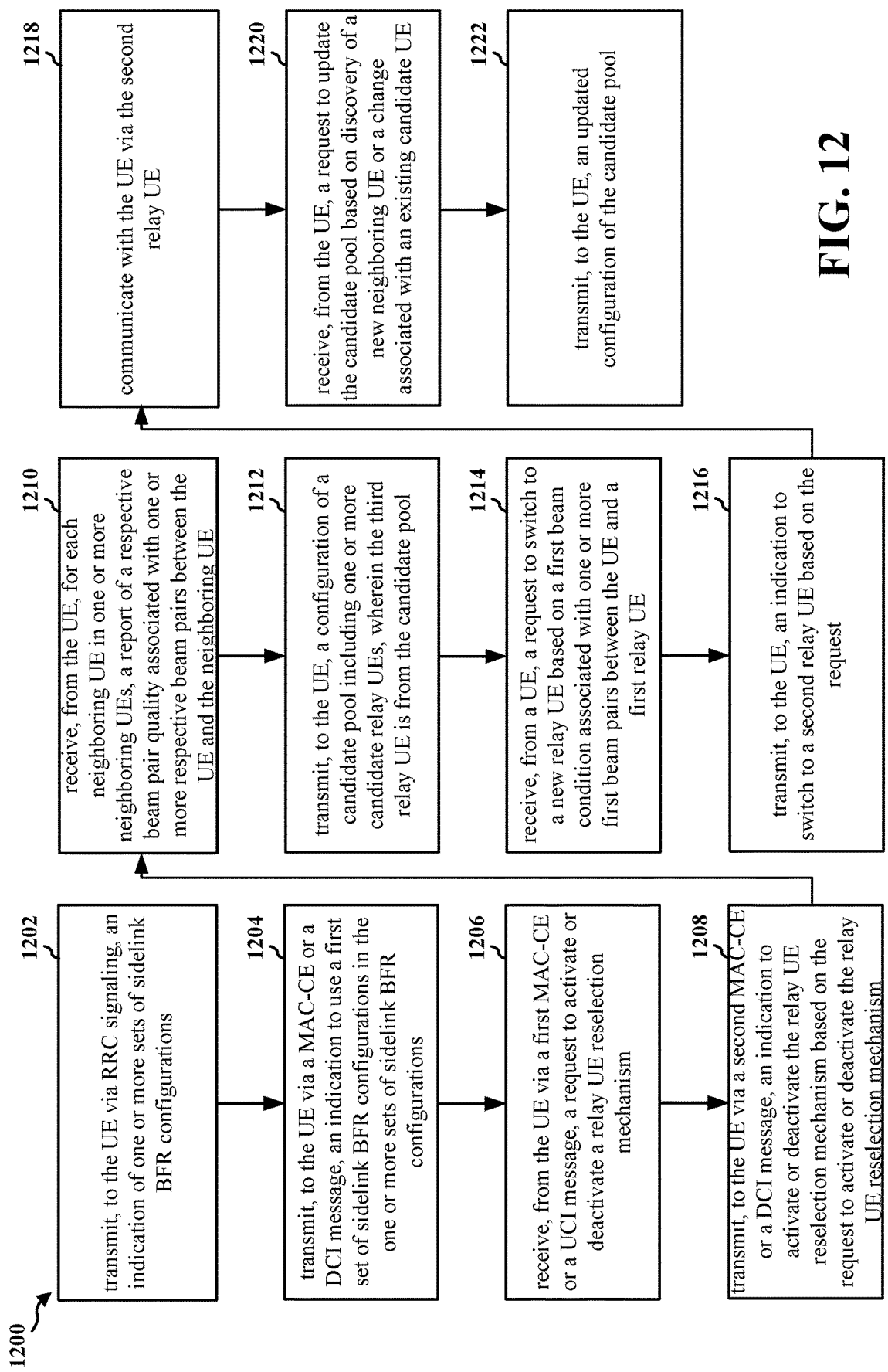
FIG. 12 is a flowchart of a method of wireless communication.

FIG. 12 is a flowchart 1200 of a method of wireless communication. The method may be performed by a network node (e.g., the base station 102/310/804; the network entity 1402). At 1214, the network node may receive, from a UE, a request to switch to a new relay UE based on a first beam condition associated with one or more first beam pairs between the UE and a first relay UE. For example, 1214 may be performed by the component 199 in FIG. 14. Referring to FIG. 8, at 822, the network node 804 may receive, from a UE 802, a request to switch to a new relay UE based on a first beam condition associated with one or more first beam pairs between the UE 802 and a first relay UE 842.

At 1216, the network node may transmit, to the UE, an indication to switch to a second relay UE based on the request. For example, 1216 may be performed by the component 199 in FIG. 14. Referring to FIG. 8, at 824, the network node 804 may transmit, to the UE 802, an indication to switch to a second relay UE 844 based on the request 822.

At 1218, the network node may communicate with the UE via the second relay UE. For example, 1218 may be performed by the component 199 in FIG. 14. Referring to FIG. 8, at 828, the network node 804 may communicate with the UE 802 via the second relay UE 844.

In one configuration, referring to FIG. 8, the request 822 to switch to the new relay UE may include a request to switch to a third relay UE.

In one configuration, the second relay UE and the third relay UE may be a same relay UE or may be different relay UEs.

In one configuration, at 1212, the network node may transmit, to the UE, a configuration of a candidate pool including one or more candidate relay UEs. The third relay UE may be from the candidate pool. For example, 1212 may be performed by the component 199 in FIG. 14. Referring to FIG. 8, at 818, the network node 804 may transmit, to the UE 802, a configuration of a candidate pool including one or more candidate relay UEs.

In one configuration, referring to FIG. 8, each candidate relay UE in the one or more candidate relay UEs in the candidate pool may be associated with a respective beam pair quality associated with one or more respective beam pairs between the UE 802 and the candidate relay UE. The one or more candidate relay UEs may be ranked based on respective beam pair qualities.

In one configuration, at 1210, the network node may receive, from the UE, for each neighboring UE in one or more neighboring UEs, a report of a respective beam pair quality associated with one or more respective beam pairs between the UE and the neighboring UE. The candidate pool may be created or updated based on the report. For example, 1210 may be performed by the component 199 in FIG. 14. Referring to FIG. 8, at 816, the network node 804 may receive, from the UE 802, for each neighboring UE in one or more neighboring UEs, a report of a respective beam pair quality associated with one or more respective beam pairs between the UE 802 and the neighboring UE.

In one configuration, at 1220, the network node may receive, from the UE, a request to update the candidate pool based on discovery of a new neighboring UE or a change associated with an existing candidate relay UE. For example, 1220 may be performed by the component 199 in FIG. 14. Referring to FIG. 8, at 830, the network node 804 may receive, from the UE 802, a request to update the candidate pool based on discovery of a new neighboring UE or a change associated with an existing candidate relay UE.

At 1222, the network node may transmit, to the UE, an updated configuration of the candidate pool. For example, 1222 may be performed by the component 199 in FIG. 14. Referring to FIG. 8, at 832, the network node 804 may transmit, to the UE 802, an updated configuration of the candidate pool.

In one configuration, referring to FIG. 8, the request 822 to switch to the new relay UE may further include a channel measurement associated with the third relay UE or a beam pair quality associated with the third relay UE.

In one configuration, referring to FIG. 8, the indication 824 to switch to the second relay UE 844 may further include an indication of a beam pair to use between the UE 802 and the second relay UE 844.

In one configuration, referring to FIG. 8, the indication 824 to switch to the second relay UE 844 may be transmitted to the UE 802 via a MAC-CE or a DCI message.

In one configuration, the first beam condition may correspond to at least one of a current sidelink beam failure, a predicted sidelink beam failure, or availability of a more suitable relay UE.

In one configuration, at 1202, the network node may transmit, to the UE via RRC signaling, an indication of one or more sets of sidelink BFR configurations. Each set of sidelink BFR configurations in the one or more sets of sidelink BFR configurations may include a configuration for a sidelink candidate pool measurement report or a configuration for a beam failure report for a relay UE reselection. For example, 1202 may be performed by the component 199 in FIG. 14. Referring to FIG. 8, at 806, the network node 804 may transmit, to the UE 802 via RRC signaling, an indication of one or more sets of sidelink BFR configurations.

At 1204, the network node may transmit, to the UE via a MAC-CE or a DCI message, an indication to use a first set of sidelink BFR configurations in the one or more sets of sidelink BFR configurations. For example, 1204 may be performed by the component 199 in FIG. 14. Referring to FIG. 8, at 808, the network node 804 may transmit, to the UE 802 via a MAC-CE or a DCI message, an indication to use a first set of sidelink BFR configurations in the one or more sets of sidelink BFR configurations.

In one configuration, at 1206, the network node may receive, from the UE via a first MAC-CE or a UCI message, a request to activate or deactivate a relay UE reselection mechanism. For example, 1206 may be performed by the component 199 in FIG. 14. Referring to FIG. 8, at 810, the network node 804 may receive, from the UE 802 via a first MAC-CE or a UCI message, a request to activate or deactivate a relay UE reselection mechanism.

At 1208, the network node may transmit, to the UE via a second MAC-CE or a DCI message, an indication to activate or deactivate the relay UE reselection mechanism based on the request to activate or deactivate the relay UE reselection mechanism. The request to activate or deactivate the relay UE reselection mechanism or the indication to activate or deactivate the relay UE reselection mechanism may be based on at least one of a beam pair quality of one or more neighboring UEs, a capability of the one or more neighboring UEs, a QoS specification, a UE DRX configuration, a power constraint of the UE, a capacity constraint of the UE, or a capability constraint of the UE. For example, 1208 may be performed by the component 199 in FIG. 14. Referring to FIG. 8, at 812, the network node 804 may transmit, to the UE 802 via a second MAC-CE or a DCI message, an indication to activate or deactivate the relay UE reselection mechanism based on the request 810 to activate or deactivate the relay UE reselection mechanism.

Figure 13:
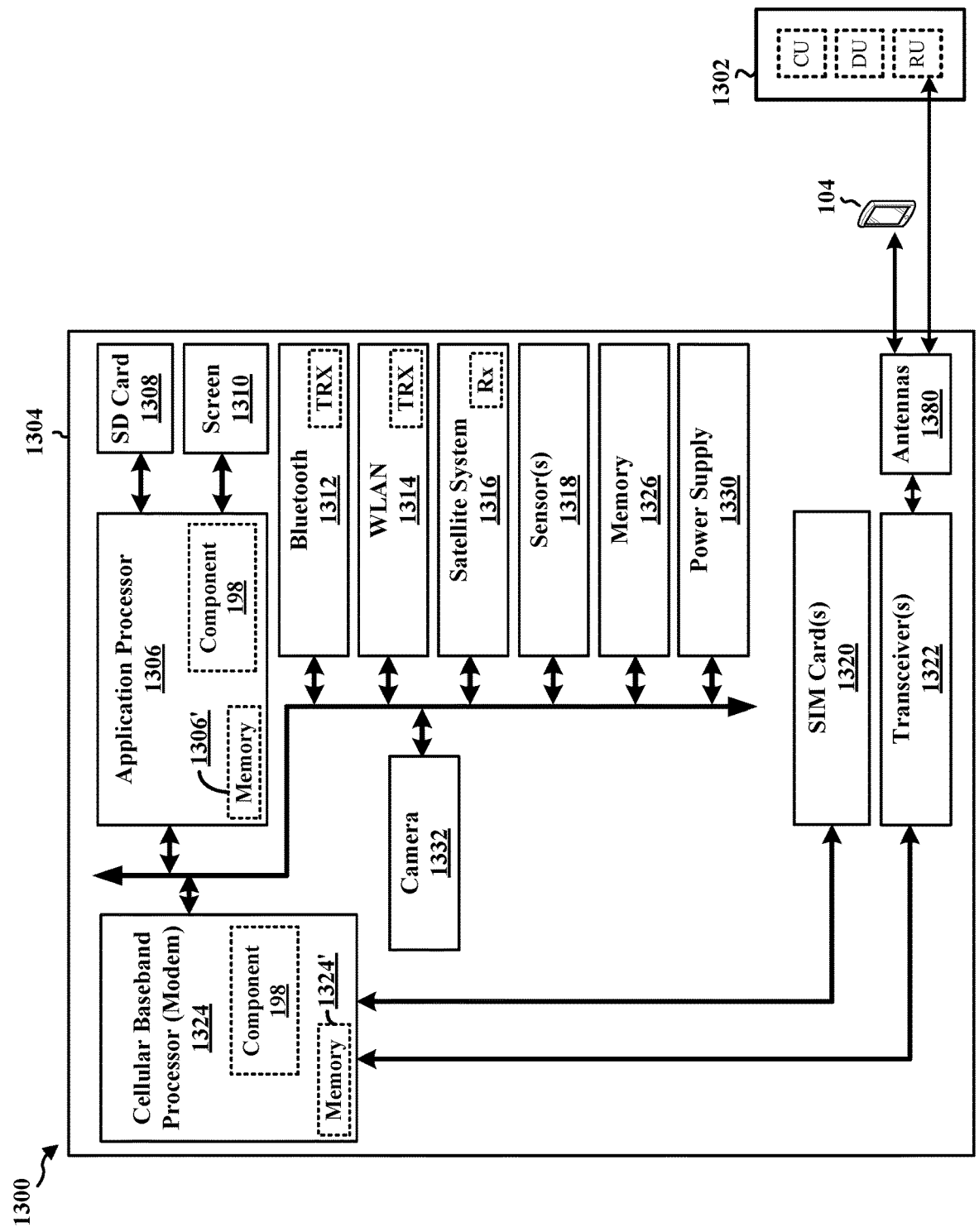
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, a satellite system module 1316 (e.g., GNSS module), one or more sensor modules 1318 (e.g., barometric pressure sensor/altimeter; motion sensor such as inertial management unit (IMU), gyroscope, and/or accelerometer(s); light detection and ranging (LI-DAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the satellite system module 1316 may include an on-chip transceiver (TRX)/receiver (RX). The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, the component 198 is configured to identify a first beam condition associated with one or more first beam pairs between the UE and a first relay UE. The component 198 may be configured to transmit, to a network node, a request to switch to a new relay UE based on the first beam condition. The component 198 may be configured to receive, from the network node, an indication to switch to a second relay UE based on the request. The component 198 may be configured to switch to the second relay UE based on the indication to switch to the second relay UE. The component 198 may be within the cellular baseband processor 1324, the application processor 1306, or both the cellular baseband processor 1324 and the application processor 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for identifying a first beam condition associated with one or more first beam pairs between the UE and a first relay UE. The apparatus 1304, and in particular the cellular baseband processor 1324 and/or the application processor 1306, includes means for transmitting, to a network node, a request to switch to a new relay UE based on the first beam condition. The apparatus 1304, and in particular the cellular baseband processor 1324 and/or the application processor 1306, includes means for receiving, from the network node, an indication to switch to a second relay UE based on the request. The apparatus 1304, and in particular the cellular baseband processor 1324 and/or the application processor 1306, includes means for switching to the second relay UE based on the indication to switch to the second relay UE.

In one configuration, the request to switch to the new relay UE may include a request to switch to a third relay UE. In one configuration, the second relay UE and the third relay UE may be a same relay UE or may be different relay UEs. In one configuration, the apparatus 1304, and in particular the cellular baseband processor 1324 and/or the application processor 1306, includes means for receiving, from the network node, a configuration of a candidate pool including one or more candidate relay UEs. The third relay UE may be selected from the candidate pool. In one configuration, each candidate relay UE in the one or more candidate relay UEs in the candidate pool may be associated with a respective beam pair quality associated with one or more respective beam pairs between the UE and the candidate relay UE. The one or more candidate relay UEs may be ranked based on respective beam pair qualities. In one configuration, the apparatus 1304, and in particular the cellular baseband processor 1324 and/or the application processor 1306, includes means for measuring, for each neighboring UE in one or more neighboring UEs, a respective beam pair quality associated with one or more respective beam pairs between the UE and the neighboring UE. The apparatus 1304, and in particular the cellular baseband processor 1324 and/or the application processor 1306, includes means for transmitting, to the network node, for each neighboring UE in the one or more neighboring UEs, a report of the respective beam pair quality. The candidate pool may be created or updated based on the report. In one configuration, the apparatus 1304, and in particular the cellular baseband processor 1324 and/or the application processor 1306, includes means for transmitting, to the network node, a request to update the candidate pool based on discovery of a new neighboring UE or a change associated with an existing candidate relay UE. The apparatus 1304, and in particular the cellular baseband processor 1324 and/or the application processor 1306, includes means for receiving, from the network node, an updated configuration of the candidate pool. In one configuration, the request to switch to the new relay UE may further include a channel measurement associated with the third relay UE or a beam pair quality associated with the third relay UE. In one configuration, the indication to switch to the second relay UE may further include an indication of a beam pair to use between the UE and the second relay UE. In one configuration, the indication to switch to the second relay UE may be received from the network node via a MAC-CE or a DCI message. In one configuration, the first beam condition may correspond to at least one of a current sidelink beam failure, a predicted sidelink beam failure, or availability of a more suitable relay UE. In one configuration, the apparatus 1304, and in particular the cellular baseband processor 1324 and/or the application processor 1306, includes means for receiving, from the network node via RRC signaling, an indication of one or more sets of sidelink BFR configurations. Each set of sidelink BFR configurations in the one or more sets of sidelink BFR configurations may include a configuration for a sidelink candidate pool measurement report or a configuration for a beam failure report for a relay UE reselection. The apparatus 1304, and in particular the cellular baseband processor 1324 and/or the application processor 1306, includes means for receiving, from the network node via a MAC-CE or a DCI message, an indication to use a first set of sidelink BFR configurations in the one or more sets of sidelink BFR configurations. In one configuration, the apparatus 1304, and in particular the cellular baseband processor 1324 and/or the application processor 1306, includes means for transmitting, to the network node via a first MAC-CE or a UCI message, a request to activate or deactivate a relay UE reselection mechanism. The apparatus 1304, and in particular the cellular baseband processor 1324 and/or the application processor 1306, includes means for receiving, from the network node via a second MAC-CE or a DCI message, an indication to activate or deactivate the relay UE reselection mechanism based on the request to activate or deactivate the relay UE reselection mechanism. The request to activate or deactivate the relay UE reselection mechanism or the indication to activate or deactivate the relay UE reselection mechanism may be based on at least one of a beam pair quality of one or more neighboring UEs, a capability of the one or more neighboring UEs, a QoS specification, a UE DRX configuration, a power constraint of the UE, a capacity constraint of the UE, or a capability constraint of the UE.

The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
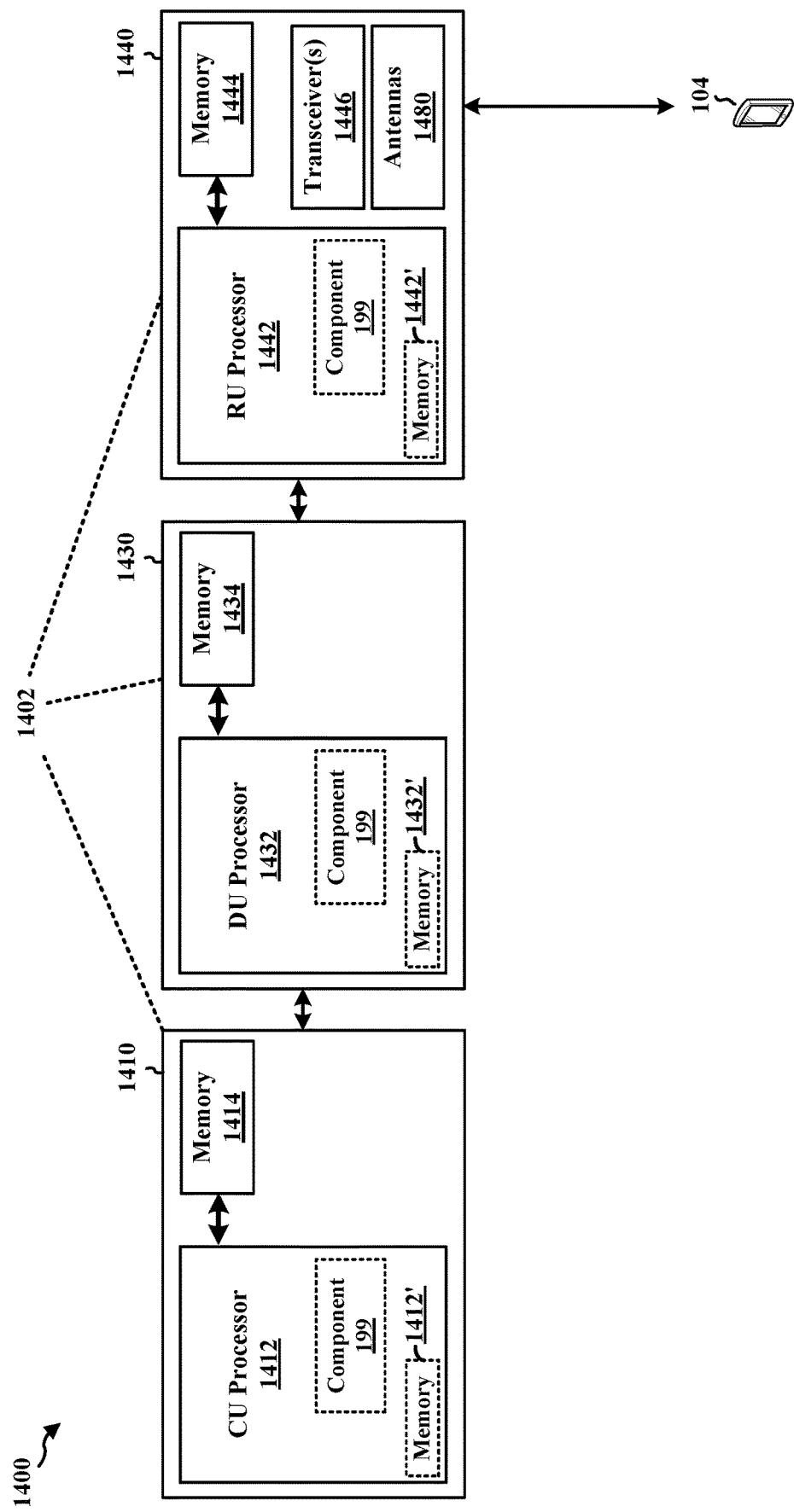
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414. The CU 1410 communicates with the DU 1430. The DU 1430 may include a DU processor 1432. The DU processor 1432 may include on-chip memory 1432'. In some aspects, the DU 1430 may further include additional memory modules 1434. The DU 1430 communicates with the RU 1440. The RU 1440 may include an RU processor 1442. The RU processor 1442 may include on-chip memory 1442'. In some aspects, the RU 1440 may further include additional memory modules 1444, one or more transceivers 1446, and antennas 1480. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to receive, from a UE, a request to switch to a new relay UE based on a first beam condition associated with one or more first beam pairs between the UE and a first relay UE. The component 199 may be configured to transmit, to the UE, an indication to switch to a second relay UE based on the request. The component 199 may be configured to communicate with the UE via the second relay UE. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for receiving, from a UE, a request to switch to a new relay UE based on a first beam condition associated with one or more first beam pairs between the UE and a first relay UE. The network entity 1402 includes means for transmitting, to the UE, an indication to switch to a second relay UE based on the request. The network entity 1402 includes means for communicating with the UE via the second relay UE.

In one configuration, the request to switch to the new relay UE may include a request to switch to a third relay UE. In one configuration, the second relay UE and the third relay UE may be a same relay UE or may be different relay UEs. In one configuration, the network entity 1402 includes means for transmitting, to the UE, a configuration of a candidate pool including one or more candidate relay UEs. The third relay UE may be from the candidate pool. In one configuration, each candidate relay UE in the one or more candidate relay UEs in the candidate pool may be associated with a respective beam pair quality associated with one or more respective beam pairs between the UE and the candidate relay UE. The one or more candidate relay UEs may be ranked based on respective beam pair qualities. In one configuration, the network entity 1402 includes means for receiving, from the UE, for each neighboring UE in one or more neighboring UEs, a report of a respective beam pair quality associated with one or more respective beam pairs between the UE and the neighboring UE. The candidate pool may be created or updated based on the report. In one configuration, the network entity 1402 includes means for receiving, from the UE, a request to update the candidate pool based on discovery of a new neighboring UE or a change associated with an existing candidate relay UE. The network entity 1402 includes means for transmitting, to the UE, an updated configuration of the candidate pool. In one configuration, the request to switch to the new relay UE may further include a channel measurement associated with the third relay UE or a beam pair quality associated with the third relay UE. In one configuration, the indication to switch to the second relay UE may further include an indication of a beam pair to use between the UE and the second relay UE. In one configuration, the indication to switch to the second relay UE may be transmitted to the UE via a MAC-CE or a DCI message. In one configuration, the first beam condition may correspond to at least one of a current sidelink beam failure, a predicted sidelink beam failure, or availability of a more suitable relay UE. In one configuration, the network entity 1402 includes means for transmitting, to the UE via RRC signaling, an indication of one or more sets of sidelink BFR configurations. Each set of sidelink BFR configurations in the one or more sets of sidelink BFR configurations may include a configuration for a sidelink candidate pool measurement report or a configuration for a beam failure report for a relay UE reselection. The network entity 1402 includes means for transmitting, to the UE via a MAC-CE or a DCI message, an indication to use a first set of sidelink BFR configurations in the one or more sets of sidelink BFR configurations. In one configuration, the network entity 1402 includes means for receiving, from the UE via a first MAC-CE or a UCI message, a request to activate or deactivate a relay UE reselection mechanism. The network entity 1402 includes means for transmitting, to the UE via a second MAC-CE or a DCI message, an indication to activate or deactivate the relay UE reselection mechanism based on the request to activate or deactivate the relay UE reselection mechanism. The request to activate or deactivate the relay UE reselection mechanism or the indication to activate or deactivate the relay UE reselection mechanism may be based on at least one of a beam pair quality of one or more neighboring UEs, a capability of the one or more neighboring UEs, a QoS specification, a UE DRX configuration, a power constraint of the UE, a capacity constraint of the UE, or a capability constraint of the UE.

The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Referring to FIGS. 4-14, a UE may identify a first beam condition associated with one or more first beam pairs between the UE and a first relay UE. The UE may transmit to a network node, and the network node may receive, from the UE, a request to switch to a new relay UE based on the first beam condition. The network node may transmit, to the UE, and the UE may receive, from the network node, an indication to switch to a second relay UE based on the request. The UE may switch to the second relay UE based on the indication to switch to the second relay UE. The UE and the network node may communicate with each other via the second relay UE. Accordingly, a BFR operation may be performed for a sidelink associated with a relay UE where a BF is detected for the sidelink associated with the relay UE. The BFR operation may include a reselection to a new relay UE. Based on the relayed link via the new relay UE, the source UE may continue to benefit from the advantages associated with the multi-connectivity mode.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method of wireless communication at a UE, including identifying a first beam condition associated with one or more first beam pairs between the UE and a first relay UE; transmitting, to a network node, a request to switch to a new relay UE based on the first beam condition; receiving, from the network node, an indication to switch to a second relay UE based on the request; and switching to the second relay UE based on the indication to switch to the second relay UE.

Aspect 2 is the method of aspect 1, where the request to switch to the new relay UE includes a request to switch to a third relay UE.

Aspect 3 is the method of aspect 2, where the second relay UE and the third relay UE are a same relay UE or are different relay UEs.

Aspect 4 is the method of any of aspects 2 and 3, further including: receiving, from the network node, a configuration of a candidate pool including one or more candidate relay UEs, where the third relay UE is selected from the candidate pool.

Aspect 5 is the method of aspect 4, where each candidate relay UE in the one or more candidate relay UEs in the candidate pool is associated with a respective beam pair quality associated with one or more respective beam pairs between the UE and the candidate relay UE, and the one or more candidate relay UEs are ranked based on respective beam pair qualities.

Aspect 6 is the method of any of aspects 4 and 5, further including: measuring, for each neighboring UE in one or more neighboring UEs, a respective beam pair quality associated with one or more respective beam pairs between the UE and the neighboring UE; and transmitting, to the network node, for each neighboring UE in the one or more neighboring UEs, a report of the respective beam pair quality, where the candidate pool is created or updated based on the report.

Aspect 7 is the method of any of aspects 4 to 6, further including: transmitting, to the network node, a request to update the candidate pool based on discovery of a new neighboring UE or a change associated with an existing candidate relay UE; and receiving, from the network node, an updated configuration of the candidate pool.

Aspect 8 is the method of any of aspects 2 to 7, where the request to switch to the new relay UE further includes a channel measurement associated with the third relay UE or a beam pair quality associated with the third relay UE.

Aspect 9 is the method of any of aspects 1 to 8, where the indication to switch to the second relay UE further includes an indication of a beam pair to use between the UE and the second relay UE.

Aspect 10 is the method of any of aspects 1 to 9, where the indication to switch to the second relay UE is received from the network node via a MAC-CE or a DCI message.

Aspect 11 is the method of any of aspects 1 to 10, where the first beam condition corresponds to at least one of a current sidelink beam failure, a predicted sidelink beam failure, or availability of a more suitable relay UE.

Aspect 12 is the method of any of aspects 1 to 11, further including: receiving, from the network node via RRC signaling, an indication of one or more sets of sidelink BFR configurations, each set of sidelink BFR configurations in the one or more sets of sidelink BFR configurations including a configuration for a sidelink candidate pool measurement report or a configuration for a beam failure report for a relay UE reselection; and receiving, from the network node via a MAC-CE or a DCI message, an indication to use a first set of sidelink BFR configurations in the one or more sets of sidelink BFR configurations.

Aspect 13 is the method of any of aspects 1 to 12, further including: transmitting, to the network node via a first MAC-CE or a UCI message, a request to activate or deactivate a relay UE reselection mechanism; and receiving, from the network node via a second MAC-CE or a DCI message, an indication to activate or deactivate the relay UE reselection mechanism based on the request to activate or deactivate the relay UE reselection mechanism, where the request to activate or deactivate the relay UE reselection mechanism or the indication to activate or deactivate the relay UE reselection mechanism is based on at least one of a beam pair quality of one or more neighboring UEs, a capability of the one or more neighboring UEs, a QoS specification, a UE DRX configuration, a power constraint of the UE, a capacity constraint of the UE, or a capability constraint of the UE.

Aspect 14 is a method of wireless communication at a network node, including receiving, from a UE, a request to switch to a new relay UE based on a first beam condition associated with one or more first beam pairs between the UE and a first relay UE; transmitting, to the UE, an indication to switch to a second relay UE based on the request; and communicating with the UE via the second relay UE.

Aspect 15 is the method of aspect 14, where the request to switch to the new relay UE includes a request to switch to a third relay UE.

Aspect 16 is the method of aspect 15, where the second relay UE and the third relay UE are a same relay UE or are different relay UEs.

Aspect 17 is the method of any of aspects 15 and 16, further including: transmitting, to the UE, a configuration of a candidate pool including one or more candidate relay UEs, where the third relay UE is from the candidate pool.

Aspect 18 is the method of aspect 17, where each candidate relay UE in the one or more candidate relay UEs in the candidate pool is associated with a respective beam pair quality associated with one or more respective beam pairs between the UE and the candidate relay UE, and the one or more candidate relay UEs are ranked based on respective beam pair qualities.

Aspect 19 is the method of any of aspects 17 and 18, further including: receiving, from the UE, for each neighboring UE in one or more neighboring UEs, a report of a respective beam pair quality associated with one or more respective beam pairs between the UE and the neighboring UE, where the candidate pool is created or updated based on the report.

Aspect 20 is the method of any of aspects 17 to 19, further including: receiving, from the UE, a request to update the candidate pool based on discovery of a new neighboring UE or a change associated with an existing candidate relay UE; and transmitting, to the UE, an updated configuration of the candidate pool.

Aspect 21 is the method of any of aspects 15 to 20, where the request to switch to the new relay UE further includes a channel measurement associated with the third relay UE or a beam pair quality associated with the third relay UE.

Aspect 22 is the method of any of aspects 14 to 21, where the indication to switch to the second relay UE further includes an indication of a beam pair to use between the UE and the second relay UE.

Aspect 23 is the method of any of aspects 14 to 22, where the indication to switch to the second relay UE is transmitted to the UE via a MAC-CE or a DCI message.

Aspect 24 is the method of any of aspects 14 to 23, where the first beam condition corresponds to at least one of a current sidelink beam failure, a predicted sidelink beam failure, or availability of a more suitable relay UE.

Aspect 25 is the method of any of aspects 14 to 24, further including: transmitting, to the UE via RRC signaling, an indication of one or more sets of sidelink BFR configurations, each set of sidelink BFR configurations in the one or more sets of sidelink BFR configurations including a configuration for a sidelink candidate pool measurement report or a configuration for a beam failure report for a relay UE reselection; and transmitting, to the UE via a MAC-CE or a DCI message, an indication to use a first set of sidelink BFR configurations in the one or more sets of sidelink BFR configurations.

Aspect 26 is the method of any of aspects 14 to 25, further including: receiving, from the UE via a first MAC-CE or a UCI message, a request to activate or deactivate a relay UE reselection mechanism; and transmitting, to the UE via a second MAC-CE or a DCI message, an indication to activate or deactivate the relay UE reselection mechanism based on the request to activate or deactivate the relay UE reselection mechanism, where the request to activate or deactivate the relay UE reselection mechanism or the indication to activate or deactivate the relay UE reselection mechanism is based on at least one of a beam pair quality of one or more neighboring UEs, a capability of the one or more neighboring UEs, a QoS specification, a UE DRX configuration, a power constraint of the UE, a capacity constraint of the UE, or a capability constraint of the UE.

What is claimed is:

1. An apparatus for wireless communication at a user equipment (UE), comprising:
    a memory; and
    at least one processor coupled to the memory and, based at least in part on information stored in the memory, the at least one processor is configured to:
        identify a first beam condition associated with one or more first beam pairs between the UE and a first relay UE;
        transmit, to a network node, a request to switch to a new relay UE based on the first beam condition;
        receive, from the network node, an indication to switch to a second relay UE based on the request; and
        switch to the second relay UE based on the indication to switch to the second relay UE.

2. The apparatus of claim 1, wherein the request to switch to the new relay UE comprises a request to switch to a third relay UE.

3. The apparatus of claim 2, wherein the second relay UE and the third relay UE are a same relay UE or are different relay UEs.

4. The apparatus of claim 2, the at least one processor being further configured to:
    receive, from the network node, a configuration of a candidate pool comprising one or more candidate relay UEs, wherein the third relay UE is selected from the candidate pool.

5. The apparatus of claim 4, wherein each candidate relay UE in the one or more candidate relay UEs in the candidate pool is associated with a respective beam pair quality associated with one or more respective beam pairs between the UE and the candidate relay UE, and the one or more candidate relay UEs are ranked based on respective beam pair qualities.

6. The apparatus of claim 4, the at least one processor being further configured to:
    measure, for each neighboring UE in one or more neighboring UEs, a respective beam pair quality associated with one or more respective beam pairs between the UE and the neighboring UE; and
    transmit, to the network node, for each neighboring UE in the one or more neighboring UEs, a report of the respective beam pair quality, wherein the candidate pool is created or updated based on the report.

7. The apparatus of claim 4, the at least one processor being further configured to:
    transmit, to the network node, a request to update the candidate pool based on discovery of a new neighboring UE or a change associated with an existing candidate relay UE; and
    receive, from the network node, an updated configuration of the candidate pool.

8. The apparatus of claim 2, wherein the request to switch to the new relay UE further comprises a channel measurement associated with the third relay UE or a beam pair quality associated with the third relay UE.

9. The apparatus of claim 1, wherein the indication to switch to the second relay UE further includes an indication of a beam pair to use between the UE and the second relay UE.

10. The apparatus of claim 1, wherein the indication to switch to the second relay UE is received from the network node via a medium access control (MAC)—control element (CE) (MAC-CE) or a downlink control information (DCI) message.

11. The apparatus of claim 1, wherein the first beam condition corresponds to at least one of a current sidelink beam failure, a predicted sidelink beam failure, or availability of a more suitable relay UE.

12. The apparatus of claim 1, the at least one processor being further configured to:
    receive, from the network node via radio resource control (RRC) signaling, an indication of one or more sets of sidelink beam failure recovery (BFR) configurations, each set of sidelink BFR configurations in the one or more sets of sidelink BFR configurations including a configuration for a sidelink candidate pool measurement report or a configuration for a beam failure report for a relay UE reselection; and
    receive, from the network node via a medium access control (MAC)—control element (CE) (MAC-CE) or a downlink control information (DCI) message, an indication to use a first set of sidelink BFR configurations in the one or more sets of sidelink BFR configurations.

13. The apparatus of claim 1, the at least one processor being further configured to:
    transmit, to the network node via a first medium access control (MAC)—control element (CE) (MAC-CE) or an uplink control information (UCI) message, a request to activate or deactivate a relay UE reselection mechanism; and
    receive, from the network node via a second MAC-CE or a downlink control information (DCI) message, an indication to activate or deactivate the relay UE reselection mechanism based on the request to activate or deactivate the relay UE reselection mechanism, wherein the request to activate or deactivate the relay UE reselection mechanism or the indication to activate or deactivate the relay UE reselection mechanism is based on at least one of a beam pair quality of one or more neighboring UEs, a capability of the one or more neighboring UEs, a quality of service (QoS) specification, a UE discontinuous reception (DRX) configuration, a power constraint of the UE, a capacity constraint of the UE, or a capability constraint of the UE.

14. The apparatus of claim 1, further comprising a transceiver coupled to the at least one processor.

15. A method of wireless communication at a user equipment (UE), comprising:
identifying a first beam condition associated with one or more first beam pairs between the UE and a first relay UE;
transmitting, to a network node, a request to switch to a new relay UE based on the first beam condition;
receiving, from the network node, an indication to switch to a second relay UE based on the request; and
switching to the second relay UE based on the indication to switch to the second relay UE.

16. An apparatus for wireless communication at a network node, comprising:
a memory; and
at least one processor coupled to the memory and, based at least in part on information stored in the memory, the at least one processor is configured to:
receive, from a user equipment (UE), a request to switch to a new relay UE based on a first beam condition associated with one or more first beam pairs between the UE and a first relay UE;
transmit, to the UE, an indication to switch to a second relay UE based on the request; and
communicate with the UE via the second relay UE.

17. The apparatus of claim 16, wherein the request to switch to the new relay UE comprises a request to switch to a third relay UE.

18. The apparatus of claim 17, wherein the second relay UE and the third relay UE are a same relay UE or are different relay UEs.

19. The apparatus of claim 17, the at least one processor being further configured to:
transmit, to the UE, a configuration of a candidate pool comprising one or more candidate relay UEs, wherein the third relay UE is from the candidate pool.

20. The apparatus of claim 19, wherein each candidate relay UE in the one or more candidate relay UEs in the candidate pool is associated with a respective beam pair quality associated with one or more respective beam pairs between the UE and the candidate relay UE, and the one or more candidate relay UEs are ranked based on respective beam pair qualities.

21. The apparatus of claim 19, the at least one processor being further configured to:
receive, from the UE, for each neighboring UE in one or more neighboring UEs, a report of a respective beam pair quality associated with one or more respective beam pairs between the UE and the neighboring UE, wherein the candidate pool is created or updated based on the report.

22. The apparatus of claim 19, the at least one processor being further configured to:
receive, from the UE, a request to update the candidate pool based on discovery of a new neighboring UE or a change associated with an existing candidate relay UE; and
transmit, to the UE, an updated configuration of the candidate pool.

23. The apparatus of claim 17, wherein the request to switch to the new relay UE further comprises a channel measurement associated with the third relay UE or a beam pair quality associated with the third relay UE.

24. The apparatus of claim 16, wherein the indication to switch to the second relay UE further includes an indication of a beam pair to use between the UE and the second relay UE.

25. The apparatus of claim 16, wherein the indication to switch to the second relay UE is transmitted to the UE via a medium access control (MAC)—control element (CE) (MAC-CE) or a downlink control information (DCI) message.

26. The apparatus of claim 16, wherein the first beam condition corresponds to at least one of a current sidelink beam failure, a predicted sidelink beam failure, or availability of a more suitable relay UE.

27. The apparatus of claim 16, the at least one processor being further configured to:
transmit, to the UE via radio resource control (RRC) signaling, an indication of one or more sets of sidelink beam failure recovery (BFR) configurations, each set of sidelink BFR configurations in the one or more sets of sidelink BFR configurations including a configuration for a sidelink candidate pool measurement report or a configuration for a beam failure report for a relay UE reselection; and
transmit, to the UE via a medium access control (MAC)—control element (CE) (MAC-CE) or a downlink control information (DCI) message, an indication to use a first set of sidelink BFR configurations in the one or more sets of sidelink BFR configurations.

28. The apparatus of claim 16, the at least one processor being further configured to:
receive, from the UE via a first medium access control (MAC)—control element (CE) (MAC-CE) or an uplink control information (UCI) message, a request to activate or deactivate a relay UE reselection mechanism; and
transmit, to the UE via a second MAC-CE or a downlink control information (DCI) message, an indication to activate or deactivate the relay UE reselection mechanism based on the request to activate or deactivate the relay UE reselection mechanism, wherein the request to activate or deactivate the relay UE reselection mechanism or the indication to activate or deactivate the relay UE reselection mechanism is based on at least one of a beam pair quality of one or more neighboring UEs, a capability of the one or more neighboring UEs, a quality of service (QoS) specification, a UE discontinuous reception (DRX) configuration, a power constraint of the UE, a capacity constraint of the UE, or a capability constraint of the UE.

29. The apparatus of claim 16, further comprising a transceiver coupled to the at least one processor.

30. A method of wireless communication at a network node, comprising:
receiving, from a user equipment (UE), a request to switch to a new relay UE based on a first beam condition associated with one or more first beam pairs between the UE and a first relay UE;
transmitting, to the UE, an indication to switch to a second relay UE based on the request; and
communicating with the UE via the second relay UE.

* * * * *